United States Patent
Kim

(10) Patent No.: US 10,757,096 B2
(45) Date of Patent: Aug. 25, 2020

(54) METHOD AND APPARATUS FOR REGISTERING A DEVICE FOR USE

(71) Applicant: Samsung Electronics Co., Ltd., Gyeonggi-do (KR)

(72) Inventor: Kyungjae Kim, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 385 days.

(21) Appl. No.: 14/942,496

(22) Filed: Nov. 16, 2015

(65) Prior Publication Data
US 2016/0142402 A1    May 19, 2016

(30) Foreign Application Priority Data
Nov. 14, 2014 (KR) .................. 10-2014-0159086

(51) Int. Cl.
| | | |
|---|---|---|
| H04L 29/06 | (2006.01) | |
| H04L 12/28 | (2006.01) | |
| H04W 4/02 | (2018.01) | |
| H04W 12/00 | (2009.01) | |
| H04W 4/70 | (2018.01) | |

(Continued)

(52) U.S. Cl.
CPC ...... *H04L 63/0853* (2013.01); *H04L 12/2809* (2013.01); *H04L 63/08* (2013.01); *H04L 63/10* (2013.01); *H04L 63/107* (2013.01); *H04W 4/02* (2013.01); *H04W 4/70* (2018.02); *H04W 12/003* (2019.01); *H04L 63/105* (2013.01); *H04W 4/021* (2013.01); *H04W 12/00503* (2019.01); *H04W 12/00505* (2019.01); *H04W 12/06* (2013.01); *H04W 84/12* (2013.01)

(58) Field of Classification Search
CPC ..... G06F 21/78; H04L 63/0853; H04L 63/10; H04L 63/107; H04L 12/2809; H04L 63/08; H04W 12/04
See application file for complete search history.

(56) References Cited

U.S. PATENT DOCUMENTS

| | | | |
|---|---|---|---|
| 6,563,730 B1* | 5/2003 | Poplevine | G11C 11/412 365/154 |
| 7,110,761 B2* | 9/2006 | Remes | G08C 19/28 340/12.51 |

(Continued)

FOREIGN PATENT DOCUMENTS

| | | |
|---|---|---|
| CN | 101060454 | 10/2007 |
| CN | 102932423 | 2/2013 |
| CN | 103685210 | 3/2014 |

OTHER PUBLICATIONS

International Search Report dated Mar. 31, 2016 issued in counterpart application No. PCT/KR2015/012168, 3 pages.

(Continued)

*Primary Examiner* — Tongoc Tran
(74) *Attorney, Agent, or Firm* — The Farrell Law Firm, P.C.

(57) ABSTRACT

A server and method for supporting device registration by the server are provided. The present disclosure relates to a sensor network, Machine Type Communication (MTC), Machine-to-Machine (M2M) communication, and technology for Internet of Things (IoT). The present disclosure may be applied to intelligent services based on the above technologies, such as smart home, smart building, smart city, smart car, connected car, health care, digital education, smart retail, security and safety services.

38 Claims, 11 Drawing Sheets

(51) Int. Cl.
*H04W 84/12* (2009.01)
*H04W 12/06* (2009.01)
*H04W 4/021* (2018.01)

(56) References Cited

U.S. PATENT DOCUMENTS

| | | | |
|---|---|---|---|
| 7,289,014 B2* | 10/2007 | Mullet | E05F 15/668 340/12.28 |
| 7,683,754 B2* | 3/2010 | Autret | G08C 19/28 340/10.1 |
| 7,724,687 B2* | 5/2010 | Autret | G07C 9/00857 340/5.8 |
| 8,245,276 B1 | 8/2012 | DeRosia et al. | |
| 2002/0031228 A1* | 3/2002 | Karkas | G07C 9/00166 380/270 |
| 2006/0069911 A1* | 3/2006 | Takabayashi | H04L 63/0428 713/150 |
| 2007/0271595 A1 | 11/2007 | Jin et al. | |
| 2009/0019134 A1* | 1/2009 | Bellifemine | H04L 63/08 709/218 |
| 2009/0129745 A1 | 5/2009 | Kinoshita et al. | |
| 2009/0178128 A1 | 7/2009 | Chiba et al. | |
| 2009/0239502 A1* | 9/2009 | Dempo | H04L 12/4011 455/411 |
| 2010/0071053 A1* | 3/2010 | Ansari | G06Q 30/04 726/12 |
| 2010/0162328 A1* | 6/2010 | Karaoguz | H04N 7/106 725/80 |
| 2010/0164720 A1* | 7/2010 | Kore | H04L 63/107 340/541 |
| 2010/0318599 A1 | 12/2010 | Yun et al. | |
| 2011/0074555 A1* | 3/2011 | Park | G06K 7/0008 340/10.4 |
| 2012/0146761 A1* | 6/2012 | de Clerq | G05B 15/02 340/4.3 |
| 2013/0061291 A1* | 3/2013 | Hegg | G06F 21/33 726/4 |
| 2013/0110991 A1 | 5/2013 | Fujimoto et al. | |
| 2013/0289752 A1 | 10/2013 | Orsat et al. | |
| 2014/0067094 A1* | 3/2014 | Park | G05B 15/02 700/90 |
| 2014/0218517 A1 | 8/2014 | Kim et al. | |
| 2015/0006695 A1* | 1/2015 | Gupta | H04L 41/32 709/223 |
| 2015/0229605 A1 | 8/2015 | Wu et al. | |
| 2016/0021081 A1* | 1/2016 | Caceres | H04L 63/08 726/7 |

OTHER PUBLICATIONS

European Search Report dated Nov. 7, 2017 issued in counterpart application No. 15858828.5-1853, 12 pages.
Chinese Office Action dated Nov. 27, 2019 issued in counterpart application No. 201510778749.3, 31 pages.

* cited by examiner

METHOD AND APPARATUS FOR REGISTERING A DEVICE FOR USE

PRIORITY

This application claims priority under 35 U.S.C. § 119(a) to Korean Patent Application No. 10-2014-0159086, which was filed in the Korean Intellectual Property Office on Nov. 14, 2014, the entire content of which is incorporated herein by reference.

BACKGROUND OF THE INVENTION

1. Field of the Invention

The present invention relates generally to the registration of a device to a gateway, and more particularly, to a method and apparatus for granting a control authority to a control device, after the control device passes an authentication procedure in a control area.

2. Description of the Prior Art

The Internet is now evolving to the Internet of Things (IoT), where distributed entities, such as things, e.g., powered objects, exchange and process information without human intervention. The Internet of Everything (IoE), which is a combination of the IoT technology and Big Data processing technology through connection with a cloud server, has emerged. As technology elements, such as "sensing technology", "wired/wireless communication and network infrastructure", "service interface technology", and "security technology" have been demanded for IoT implementation, a sensor network, a Machine-to-Machine (M2M) communication, Machine Type Communication (MTC), etc., are currently being researched.

An IoT environment may provide intelligent Internet technology services that create a new value to human life by collecting and analyzing data generated among connected things.

IoT may be applied to a variety of fields including smart home, smart building, smart city, smart car or connected cars, smart grid, health care, smart appliances and advanced medical services through convergence and combination between existing Information Technology (IT) and various industrial applications.

However, as IoT technology and the Internet evolve as described above, in the equipment controlled by a user using the mobile device, technologies such as information security, registration procedures, and authentication procedures for control devices are desired in order to prevent control and/or hacking by an unauthorized user.

SUMMARY OF THE INVENTION

The present invention has been made to address the above-mentioned technical problems.

An aspect of the present invention is to provide a method and apparatus for registering a control device for controlling equipment in a system.

Another aspect of the present invention is to provide a device and method for generating an authentication key to register to a control device based on user information and a control area of the user, and granting a control authority for the control area if an authentication procedure is completed using the authentication key.

In accordance with an aspect of the present invention, a method is provided for supporting, by a server, a registration of a device for use. The method includes receiving an authentication information generation request from a user terminal; determining a control allowance area of the user terminal in response to the authentication information generation request; generating authentication information based on a predetermined authentication method for the determined control allowance area; and requesting a control device to register the generated authentication information. The authentication method includes information on an object to be authenticated for the determined control allowance area.

In accordance with another aspect of the present invention, a method is provided for registering a device for use of a control device by a gateway. The method includes receiving, from a user terminal, a control request for a control device; determining whether authentication information corresponding to the gateway is registered in the control device; if the authentication information corresponding to the gateway is registered in the control device, determining an authentication method of an area controlled by the gateway; and if the authentication method is an equipment authentication, granting a control authority to the control device based on the determined authentication method and an authentication identification message received from an equipment in the area controlled by the gateway. The authentication method includes information on an object to be authenticated for a control allowance area of the user terminal.

In accordance with another aspect of the present invention, a method is provided for supporting, by a control device, a registration of a device for use. The method includes receiving a connection initiation request from a gateway of a registration area; registering authentication information in response to the connection initiation request; determining an authentication method of an area to be controlled based on the authentication information; if the authentication method is an equipment authentication, transmitting the authentication information to an equipment of the area to be controlled; and receiving a control authority corresponding to the authentication information from a gateway of the area to be controlled.

In accordance with another aspect of the present invention, a server is provided, which supports registration of a device for use. The server includes a communication unit that communicates information with at least one of a gateway or a user terminal; and a controller that determines a control allowance area of the user terminal in response to an authentication information generation request received from the user terminal, generates authentication information based on a pre-determined authentication method for the determined control allowance area, and requests a control device to register the generated authentication information.

In accordance with another aspect of the present invention, a gateway is provided, which registers a device for use of a control device. The gateway includes a communication unit that communicates information with a server, a user terminal, and a control device; and a controller that determines whether authentication information corresponding to the gateway is registered in the control device when receiving, from the user terminal, a control request of the control device, determines an authentication method of an area controlled by the gateway when the authentication information is registered in the control device, and grants, when the authentication method is an equipment authentication, a control authority to the control device based on the determined authentication method and an authentication identification message received from an equipment in the area controlled by the gateway. The authentication method includes information on an object to be authenticated for a control allowance area of the user terminal.

In accordance with another aspect of the present invention, a control device is provided, which supports registration of a device for use. The control device includes a communication unit that communicates information with a server, a gateway, a user terminal, and a control device; and a controller that receives a connection initiation request from a gateway of a registration area, registers authentication information in response to the connection initiation request, determines an authentication method of an area to be controlled based on the authentication information, when the authentication method is an equipment authentication, transmits the authentication information to an equipment in the area to be controlled, and receives a control authority for the area corresponding to the authentication information from the gateway of the area to be controlled.

BRIEF DESCRIPTION OF THE DRAWINGS

The above and other aspects, features, and advantages of certain embodiments of the present invention will be more apparent from the following detailed description when taken in conjunction with the accompanying drawings, in which.

DETAILED DESCRIPTION OF EMBODIMENTS OF THE INVENTION

Figure 1:
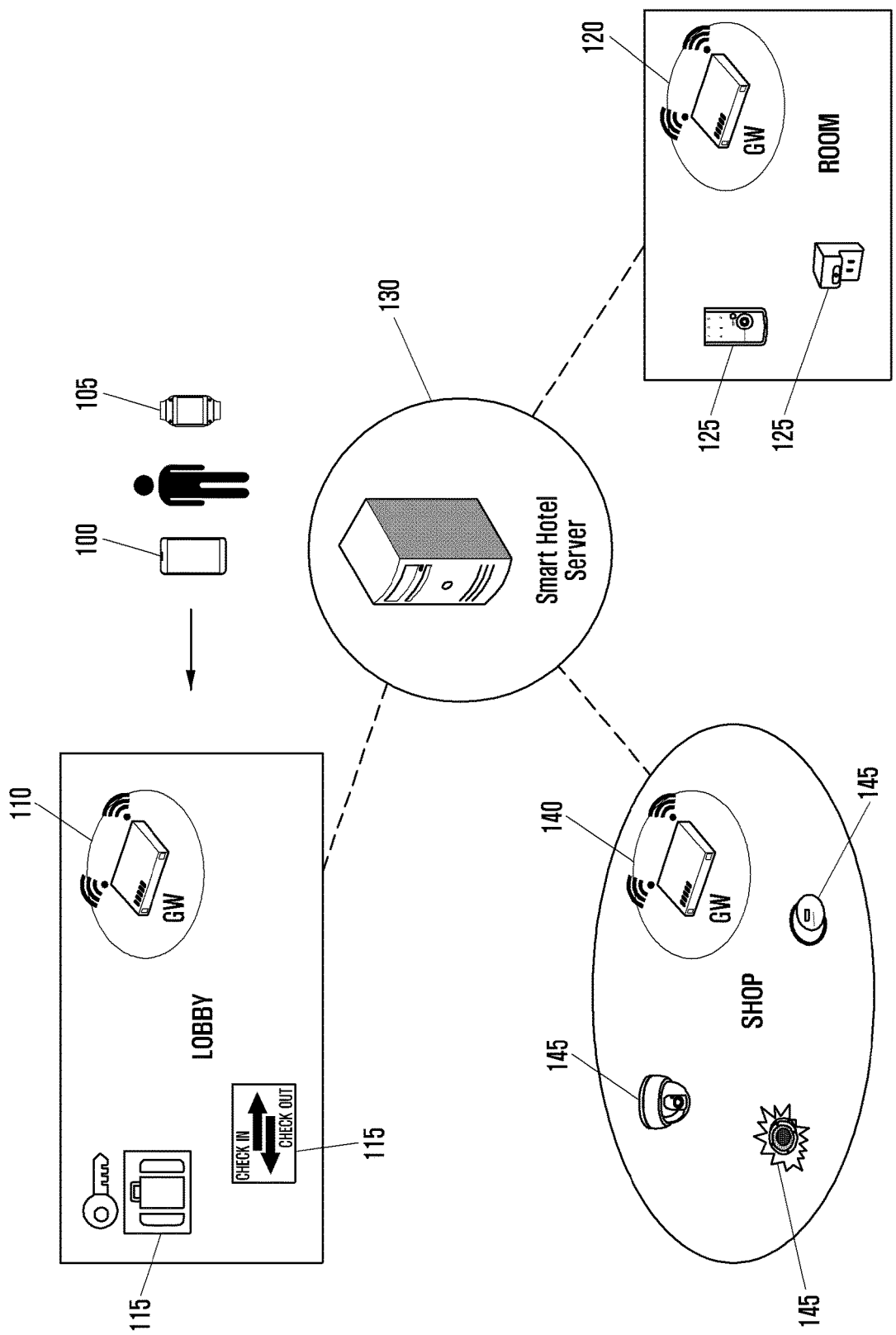
FIG. 1 illustrates a system for registering a device to a gateway according to an embodiment of the present invention.

Various embodiments of the present invention will now be described in detail with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

For similar reasoning, in the accompanying drawings, some elements may be exaggerated, omitted, or schematically illustrated. Further, the size of each element does not necessarily reflect the actual size.

Herein, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Further, each block of the flowchart illustrations may represent a module, segment, or portion of code, which includes one or more executable instructions for implementing the specified logical function(s).

In some alternative implementations, the functions noted in the blocks may occur out of the illustrated order. For example, two blocks shown in succession may in fact be executed substantially at the same time or in the reverse order, depending upon the functionality involved.

Herein, the term "unit" or "module" refers to a software element or a hardware element, such as a Field Programmable Gate Array (FPGA) or an Application Specific Integrated Circuit (ASIC), which performs a predetermined function. However, the term "unit" or "module" are not limited to meaning software or hardware. A unit or module may be constructed either to be stored in an addressable storage medium or to execute one or more processors. Therefore, the term "unit" or "module" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters.

Herein, the elements and functions provided by a unit or module may be either divided into a larger number of elements, units, or modules, or combined into a smaller number of elements, units, or modules. Further, the elements, units, or modules may be implemented to reproduce one or more Central Processing Units (CPUs) within a device or a security multimedia card.

FIG. 1 illustrates a system for registering a device to a gateway according to an embodiment of the present invention.

Referring to FIG. 1, the system includes a user terminal 100, a control device 105, e.g., a smartwatch, a gateway 110 of a registration area (e.g., a hotel lobby), a gateway 120 of a control area (e.g., a guestroom), a gateway 140 of another control area (e.g., a shop), a plurality of equipment 115, 125, and 145 of the respective gateways 110, 120, and 140, and a server 130.

The user terminal 100 may connect a user and the system. The user may perform various operations for registering the control device 105 to one of the gateways through the user terminal 100. The user terminal 100 may receive an Identification (ID) and password configuration from the user at the time of an initial connection by the user to the system. The user terminal 100 may generate a user account in the system based on the received configuration.

For example, the user terminal 100 may include a smartphone, and/or a storage medium that stores algorithms or the like. The user terminal 100 may connect to the server 130 of the system based on the received configuration in an environment such as a wireless Local Area Network (LAN). For example, the user terminal 100 may include a communication module for connecting to the server 130. The user terminal 100 may request registration of a user thereof using a user account.

The user terminal 100 may include a display unit, an input unit, a storage unit, and a control device, and may display, on the display unit, settings for receiving the ID and Password configuration from the user. In addition, the display unit may include a touchpad that allows the user to input information using a finger or a touch pen.

The display unit may display an indication as to whether the user account is registered in the server, and when the user account is not registered in the server, the settings for repetitively receiving the ID and Password configuration. When the user account is registered in the server 130, the display unit may display a registration completion message.

The user terminal 100 may be a mobile device or a wearable electronic device, as well as the smartphone. Examples of the wearable device include a mounting-on glasses type device, a bracelet type device, an arm band type device, and a pendant type device.

The user terminal 100 may store "user information" in the storage unit. The user information may include information on a user's name, address, occupation, etc. The user information may be used as a reference to distinguish the plurality of users stored in the server. In addition, the user information may include grade information at the time of the registration by the user on the server 130. The grade information may include information on an area in which the control is permitted to the user registered through the user terminal 100. The grade information may be differentially determined for each user, for example, based on a fee paid by the user for registering to the system. The control allowance area information generated by the server 130 may be based on the user information.

The user terminal 100 may be connected to a gateway of a control area using a wireless communication in the control area. For example, the wireless communication may include Bluetooth, WIFI, WIFI-Direct, Zigbee, Z-wave, or Near Field Communication (NFC).

The user terminal 100 may request a gateway of a control area to control the control area utilizing wireless communication. Thereafter, the user terminal 100 may receive, from the gateway of the control area, a result of the control request.

When the gateway of the control area to which the control request has been made corresponds to a gateway of the control area of which a control by the user terminal 100 has been allowed, the user terminal 100 may receive a security key from the gateway. The "security key" indicates that the user terminal 100 has a control authority in the control area to which the control request has been made according to the user information or user-included grade information.

The user terminal 100 may perform a control command along with the security key, after receiving the issued security key. In addition, the user terminal 100 may proceed with an authentication process of the control device 105 in the control area using the control command and the security key.

In addition, the user terminal 100 may display a message indicating the result of the above-described process. That is, when the user terminal 100 receives the security key from a gateway of a control allowance area, the user terminal 100 may display an identification message for the control allowance area. However, when the user terminal 100 makes a control request for an area to which the control is not allowed, the user terminal 100 will not receive the security key from a gateway of the control area. For example, after making a control request to a gateway of a control area, when no response is received within a certain time, the user terminal 100 may determine that the control is not allowed for the control requested area. When the control is not allowed for the control requested area, the user terminal 100 may display a message indicating that the control for the area is not allowed.

The control device 105 may be used by a user to control the equipment 115, 125, and 145 in each area. For example, the control device 105 may be a smart phone, a mobile device, or a wearable device.

Alternatively, the system may include a plurality of control devices 105, which can be connected to a gateway of a registered area utilizing wireless communication, e.g., Bluetooth, WIFI, WIFI-Direct, Zigbee, Z-wave, or NFC.

Further, each of the gateways 110 and 120 and the controller 105 may include a communication module or the like for performing wireless communication.

The control device 105 may register an authentication key generated by the server 130 through the gateway 110 of the registration area. The authentication key may be used to authenticate the user in the area to be controlled by the control device 105. In addition, the authentication key may include authentication information. Accordingly, in the following description, "authentication key" may be used interchangeably with "authentication information".

The authentication key may perform the authentication procedure with a gateway of an area to be controlled. In addition, the authentication key may perform the authentication procedure with equipment of the area to be controlled.

The authentication key may be generated in the server 130, based on the authentication method in the control area to be performed the authentication.

The control device 105 may display information for registering in the server 130. For example, when receiving a connection initiation request from the gateway 110 of the registration area through the wireless communication, the control device 105 may display a message indicating the receipt of the request.

The connection initiation request received from the gateway 110 of the registration area may include a registration request for the authentication key generated by the server 130.

In addition, the control device 105 may display, upon receiving the request, a message requesting the user to connect with the gateway 110 of the registration area and registration approval for the authentication key generated by the server 130. For example, the message requesting the registration approval displayed on the control device 105 may be in the form of a pop-up window in which the user may press a button to approve the connection to the gateway 110 and the registration of the authentication key.

The control device 105 may perform an authentication procedure in order to control the equipment 115 in the control area. The control device 105 may perform an authentication procedure using the registered authentication key. The control device 105 may determine the authentication method of the area to be controlled based on the registered authentication key.

For example, the authentication method may include information on an object which is to be authenticated for each of the control areas and at least one among the server authentication, the gateway authentication, and the equipment authentication in the control area.

In addition, the authentication method may be determined based on the characteristics of the control area. For example, based on the characteristics of the control area, by differentially applying the authentication method by each area, it is possible to proceed with an authentication process that meets the security criterion required for each area.

For example, when the determined authentication method is server authentication, because the authentication in the registration area has already been made from the server 130 using the user accounts and user information, the control device 105 receives the control authority of the control area without an additional authentication, e.g., in public areas not requiring high security.

In addition, when the determined authentication method is a gateway authentication, the control device 105 may perform an authentication procedure by transmitting an authentication key corresponding to a gateway of the control area.

In addition, when the determined authentication method is an equipment authentication, the control device 105 determines the number of the equipment to be authenticated in/by the control area. The control device 105 then transmits the authentication key to the equipment in the control area corresponding to the determined number of the equipment. For example, the control device 105 may select equipment to perform the authentication procedure in the control area. The control device 105 and the equipment in the control area can be connected using wireless communication, e.g., Bluetooth, WIFI, WIFI-Direct, Zigbee, Z-wave, or NFC.

In addition, the control device 105 may separately receive an authentication key for the equipment authentication. For example, instead of receiving a registration request of the authentication key from the gateway 110 of the registration area, as described above, the control device 105 may transmit an authentication initiation request to a gateway of a control area, and in response to the authentication initiation request, may receive an authentication key for equipment authentication from the gateway of the control area. In this process, the control device 105 may receive additional authentication from the server 130 through the gateway of the control area, e.g., GW 140 of the shop.

When the authentication process has been completed, the control device 105 may receive, from the gateway of the control area, an authority for the equipment control.

As described above, because the authentication is made by connecting the control device 105 and equipment in a control area without a gateway, through an authentication procedure that uses a method for transmitting an authentication key to the equipment, the risk of exposure of the authentication key corresponding to the gateway can be reduced.

In accordance with another embodiment of the present invention, the control device 105 may receive an authentication initiation request from a gateway of a control area, in order to start the authentication process. Further, the control device 105 may transmit an authentication complete message to the gateway of the control area.

The control device 105 may display information for the user to control the device. The control device 105 may be connected to a gateway of a control area through wireless communication. Further, the gateways 110, 120, and 140 and the controller 105 may include a communication module or the like for performing the wireless communication as described above.

The control device 105 may display, when receiving authority for controlling equipment from a gateway of a control area, a message indicating that there is a control authority. The control device 105 may display, when the control authority is granted from the control area, information on one or more equipment that can be controlled in the control area. That is, the control device 105 may display the information on the list of the controllable equipment and the control method thereof.

The control device 105 may also be used for identifying the user, as a procedure for authenticating in order to grant control authority in the control area. That is, when the control device 105 is a wearable device, the control device 105 may utilize measured unique biological information, e.g., a finger print, as an additional authentication factor.

The unique biological information of the user generally refers to biological information that can identify a user and may include information on physical and behavioral characteristics. Examples of physical characteristics may include a fingerprint, an iris, a facial feature, a vein, etc., and examples of behavioral characteristics may include voice, signatures, etc.

Accordingly, when a user has stolen the control device 105, the unique biological information as an additional authentication factor can prevent the unauthorized user from being identified as an operator that has a legitimate right to operate the control device 105.

Further, in the authentication method for each area, when an area requires a high security level, the gateway control area may further request the control device 105 to collect the user's biological information. In order to compare the user's biological information collected through the control device 105, the server 130 may receive the collected user's biological information from an external server, or may collect the user's biological information at the time of receiving the authentication key by the control device 105 from the server 130.

In addition, the control device 105 may be utilized for executing an automatic control of the control device 105 in a predetermined area by using the unique biological information measured by the device 105. For example, the gateway 120 of the control area may collect a change of the user's unique biological information and an operation pattern of the equipment 125 detected through the control device 105, which is authenticated through the process. In this case, the user's current biometric-specific information may be detected through the control device 105 and current user's unique biological information can be transmitted to the gateway 120 of the control area. The gateway 120 of the control area may perform automatic control of the equipment 125 according to the stored operation pattern of the equipment 125 by receiving the information.

In addition, it is possible to determine the user's location in the control area by using the control device 105, e.g., based on the movement of the control device 105 detected by a control sensor attached to the equipment of the control area. For example, the gateway 120 of the control area may control the equipment 125 in the control area, and when the equipment 125 corresponds to fixed equipment, the location information of the equipment can be stored. Therefore, when the control device 105 is in close proximity to the equipment 125, and the gateway 120 of the control area may collect signals received from the equipment 125 and determine the position of the control device 105.

Alternatively, the control device 105 may be the same device as the user terminal 100. That is, the user terminal 100 may be used to register a user account on the server 130, and may be used as the control device 105 for controlling the equipment in the control area.

Further, a plurality of control devices 105 may be present for the same user. That is, the user may perform the operations described above using a plurality of control devices 105.

In particular, the plurality of control devices 105 may be used to apply differentiated authentication methods for each operation of the user in the control area. More specifically, when the security level is determined for each operation of the user, the differentiated authentication methods can be applied based on the number and types of the plurality of control devices 105 to reach the security level.

In addition, in order to reach the security level, the differentiated authentication methods can be applied, which are considered based on the number and types of the unique identification information of the user acquired from a plurality of control devices 105. The unique identification information can identify whether the operator of the control devices 105 is an authorized user of the control devices 105.

For example, the unique identification information may include a password input into the user terminal 100 when creating a user account in order to request authentication key generation from the server 130. Further, the unique identification information may include a user authentication issued by an official authentication authority.

However, when the control device 105 is a wearable device, the unique identification information may include the measured user-specific biological information as described above.

In addition, in order to apply the differential authentication methods according to the security level, all the number of and types of the plurality of control devices 105, and the number of and types of the unique identification information can be combined and utilized. Further, it is possible to perform an authentication procedure using a plurality of control devices 105 of the users in a certain group unit. For example, if a group is formed of two users using one room, the control authority can be granted to the two users only when the authentication procedure on the control device 105 by the two users has completed for any operation.

The gateways 110, 120, and 140 of the registration area and the control areas connect the control device 105 and the equipment 115, 125, and 145.

In addition, a separate gateway device may be used as the gateways 110, 120, and 140 for respective areas, and one of the equipment 115, 125, and 145 within the area may perform the role of the gateway. The gateways 110, 120, and 140 may register the control device 105 for controlling the equipment 115, 125, and 145.

Further, the gateways 110, 120, and 140 may register and control one or more equipment 115, 125, and 145 in the control areas.

The gateways 110, 120, and 140 may transmit and receive information for control, to and from the control device 105, using wireless communication. Further, the gateways 110, 120, and 140 may transmit and receive information for control, to and from the equipment 115, 125, and 145, using wireless communication.

As described above, each of the gateways 110, 120, and 140 may include a wireless communication module for wireless communication.

Additionally, the gateway 110 of the registration area may include all the functions of the gateways 120 and 140 of the control areas.

The gateway 110 of the registration area may receive, from the server 130, a registration request of the authentication key for the control device 105. The gateway 110 of the registration area may transmit a connection initiation request to the control device 105 in response to the registration request for authentication key. The gateway 110 of the registration area may transmit the registration request for the authentication key by including the registration request in the connection initiation request. The gateway 110 of the registration area may transmit the connection information to the server 130, when receiving a connection complete message from the control device 105. The gateway 110 of the registration area may inform the gateways 120 and 140 of the control areas that a control is permitted to the control device 105 in the control areas by registering the authentication key to the control device 105.

The gateway 120 of the control area may issue, when receiving the control request from the user terminal 100, a security key to the user terminal 100 using the control device 105. The gateway 120 of the control area may issue the security key when the authentication key registered in the control device 105 corresponds to the gateway itself. The authentication key is generated based on the control allowance area that is determined based on the user information to be controlled. When the authentication key is registered to the control device 105, control is permitted to the user of the control device 105 in the control area.

As described above, in accordance with an embodiment of the present invention, differentiated services may be provided to the user for each area by the gateways 120 and 140 of the control areas. In addition, it is possible to improve a security level of user control by granting control to only control devices registered the authentication key generated by the server 130.

In addition, when receiving a control command and a security key from the user terminal 100 having been issued the security key, the gateways 120 and 140 of the control areas may perform a further authentication procedure with respect to the control device 105. That is, the gateways 120 and 140 of the control areas may determine the authentication method in the control area and perform an authentication procedure with respect to the control device 105.

The gateways 120 and 140 of the control areas may utilize, for the authentication procedure, the equipment 125 and 145 in the control areas controlled by the gateways 120 and 140 of the control areas, depending on the authentication method.

By performing the additional authentication procedures as described above, because the connection with one or more equipment is required, as well as the connection of the gateway 120, it is possible to prevent theft and unauthorized use of a distributed authentication key.

The equipment 115, 125, and 145 may include equipment that can be controlled by the user in the respective areas. For example, the equipment 125 may be controlled by the control device 105 being registered in the gateway 120 within the control area.

The equipment 125 and 145 may perform an authentication for granting a control authority to the control device 105 in the control areas using the authentication information For example, the equipment 125 and 145 may receive the authentication key from the control device 105 using the wireless communication. When the authentication key corresponds to the authentication key previously received by the equipment, the equipment may transmit an authentication identification message to the gateway 120 of the control area.

The authentication key may include a Media Access Control (MAC) address of the control device 105. For example, the MAC address, i.e., a quasi-unique identifier attached to network adapters, may be configured with 48 bits, which operate as a name of a particular network adapter, and includes an identification code of a manufacturer company or the like.

In addition, the authentication information may correspond to any information that the server 130 has generated. In this case, the equipment 125 and 145 in the control areas may receive, from the gateways 120 and 140 of the control areas, the MAC address information on the control device 105 to be pre-authenticated and then store the MAC address information. When receiving the MAC address from the control device 105, the equipment 125 and 145 in the control areas may compare the MAC address received from the control device 105 to the MAC address received from the gateways 120 and 140 of the control areas and stored in advance, and then may determine whether to authenticate the control device 105 based on the comparison. The equipment 125 and 145 in the control areas may transmit, when completing the authentication on the control device 105, an authentication identification message to the gateways 120 and 140 of the control areas.

The server 130 may receive and store, from each device, information for the system to operate, and then transmit the information to each device. That is, the server 130 may be connected to the gateways 110 and 120 for each area and the user terminal 100, and may transmit and receive the information to and from the gateway and the user terminal, e.g., using wireless communication.

The server 130 may differentially determine the information for allowing a user to control in an area. That is, the server 130 may receive the user information from the user terminal 100 and determine a control allowance area for the user based on the user information. In addition, the server 130 may determine the authentication method of the control device 105 in the control allowance area. The authentication method may be determined in advance based on the information according to the characteristics of the control allowance area. The authentication method may include information on the object to be authenticated for each of the control areas. As described above, the authentication method may include server authentication, gateway authentication, and/or equipment authentication in the control area.

The server 130 may generate an authentication key to be registered in the control device 105 based on the determined authentication method. That is, the server 130 may generate an authentication key corresponding to the authentication object that is determined by the authentication method.

The server 130 may request the gateway 110 of the registration area to register the generated authentication key to the control device 105 to be used by the user. The server 130 may receive connection information from the gateway 110 of the registration area. The connection information may include a registration completion message for the authentication key.

The server 130 may apply a security standard by differentiating the authentication procedure according to the characteristics of the control area for authentication, by generating the authentication key differentially applied with an authentication method according to the control allowance area, as described above, and registering the authentication key to the control device 105.

In addition, if the authentication method in the control area is an equipment authentication, the server 130 may generate the authentication key by separating the authentication key for the gateway and the authentication key for the equipment in the control area. That is, to register the authentication key to the control device 105 through the gateway 110 of the registration area as described above, it is possible to generate an authentication key corresponding to the gateway 120 of the control area and then request the registration of the authentication key. Thereafter, when receiving the server authentication request from the gateway 120 of the control area, it is possible to progress an additional authentication process and generate an authentication key for the equipment 125 of the control area. Through the additional authentication process, it is possible to adjust an authentication level for the control area requiring more intensive security.

In addition, the server 130 may receive a user behavior pattern through the control device 105 and receive, from the gateways 120 and 140 of the control areas, history information for the operations of the equipment 125 and 145 corresponding to the change of the biological-specific information. The server 130 may store the history information based on the user information of the user. The server 130 may then transmit the history information to the gateway 120 of the control area, such that the history information can be used for automatic control of the equipment 125 and 145 in accordance with the behavior pattern of the user in the gateways 120 and 140 of the control areas.

As described above, the system illustrated in FIG. 1 is characterized in that it can be used to provide a differentiated service for each area. For example, the system may be applied to buildings, hospitals, offices, hotels, etc. In the following, for the understanding of the present invention, descriptions will be given mainly to an example of a hotel, but the scope of the present invention is not limited thereto.

Figure 2:
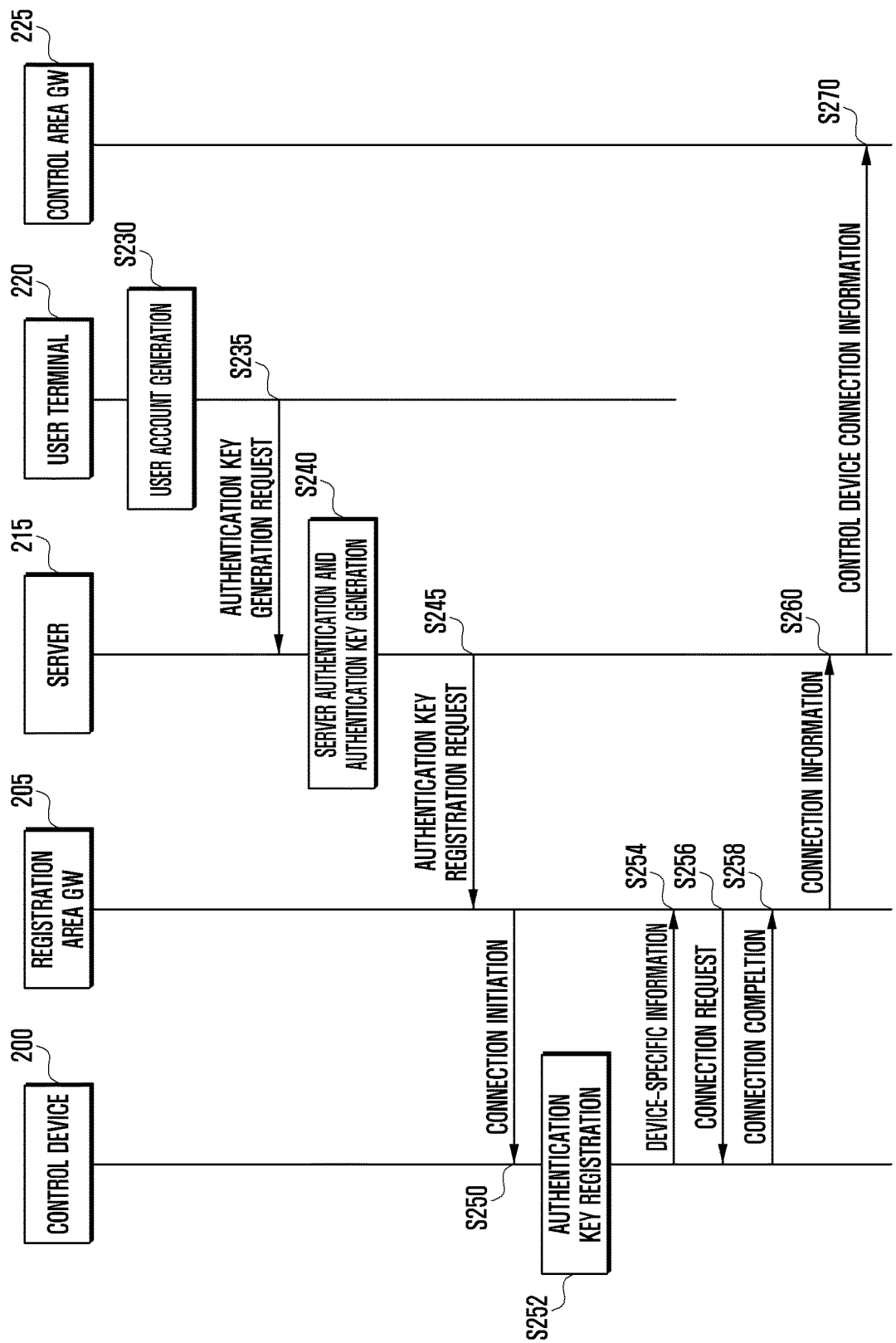
FIG. 2 is a signal flow diagram illustrating a method for registering a security key in a registration area according to an embodiment of the present invention.

FIG. 2 is a signal flow diagram illustrating a method for registering a security key in a registration area according to an embodiment of the present invention.

Referring to FIG. 2, in step S230, a user terminal 220 receives Identification (ID) information and password information from a user and generates a user account. The user terminal 220 may display a screen for receiving the ID information and password information through the display unit of the user terminal. In addition, the user terminal 220 may include a touch pad, provided on the display unit, for receiving the information from the user. The information can be received by using a touch pen or a user's finger on the touch pad.

In step S235, the user terminal 220 sends, to the server 215, an authentication key generation request including the generated user account information. The authentication key generation request may also include user information of the user terminal.

As described above, the user information indicates information on a specific user of the terminal 220. For example, the user information may be obtained from subscription information of a carrier to which the user terminal 220 subscribes, and may include information on a user's name, address, occupation, etc. The user information may be used as a reference to distinguish the plurality of users stored in the server 215. In addition, the user information may be used for generating user behavior pattern stored in the server 215 and the history information for operations of equipment corresponding to a change of biological-specific information.

In addition, the user information may include grade information at the time of the registration by the user on the server 215. The grade information may indicate the information on the degree of control authority which can be obtained in the system by the user who is registered through the user terminal 220. The grade information may include, for example, information on the control allowance area. For example, when the user uses the user terminal 220 to send the authentication key generation request to the server 215, the grade information may be determined based on user reservation information, payment information, etc.

In step S240, the server 215 generates a server authentication key, in response to the request. For example, the server 215 may determine a control allowance area based on the grade information included in the user information. The control allowance area indicates a control area in which a user who is registered in the server 215 using the user terminal 220 may control equipment using a control device 200.

For example, when the grade information corresponds to grade five, control allowance area information on the user can be determined as having only the control authority for the user's room. However, if the grade information corresponds to grade three, control allowance area information on the user can be determined as having the control authority for a restaurant and a sauna, in addition to the user's room.

The server 215 may generate an authentication key corresponding to a gateway of a control area that corresponds to the control allowance area.

The server 215 may determine an authentication method of a control area that corresponds to the control allowance area. The server 215 may determine the authentication method of the control allowance area based on information that is determined beforehand by the server 215. The authentication method may include information on an object to be authenticated for each control area. As described above, the authentication method may include server authentication, gateway authentication, and/or equipment authentication in the control area. In addition, the authentication method may be determined based on characteristics of a control area.

When the determined authentication method of the control allowance area is a server Authentication, the server 215 determines whether the user has a registration authority based on the received user information. For example, for a hotel, by comparing reservation information stored in advance and the user information, if it is determined that the user has the registration authority based on the comparison, another authentication key is not generated.

When the determined authentication method of the control allowance area is a gateway authentication, the server 215 generates an authentication key corresponding to a gateway 225 of the control allowance area, i.e., a control gateway.

In addition, when the determined authentication method of the control allowance area is an equipment Authentication, the server 215 determines a number of equipment to be authenticated among equipment in the control allowance area. Thereafter, the server 215 may generate an authentication key corresponding to the determined number of equipment.

In step S245, the server 215 transmits an authentication key registration request for the control device 200 to a gateway 205 of a registration area, i.e., a registration gateway.

In step S250, the registration gateway 205 transmits a connection initiation request to the control device 200. The connection initiation request may include a registration request for authentication keys of the control device 200.

In step S252, the control device 200 registers the authentication key, in response to the registration request for authentication keys included in the connection initiation request. The control device 200 may display, on the display unit, when receiving the registration request of the authentication key, a message requesting approval of the registration of the authentication key. The message requesting approval of the registration may be displayed in the form of a pop-up, on the display unit of the control device 200, and include a button. The user may input the approval signal of the authentication key registration to the control device 200, e.g., by touching the message of the control device 200 using a touch pen or a finger and input an authentication key registration approval signal.

In step S254, after receiving the approval signal of the authentication key registration, the control device 200 transmits the device-specific information to the registration gateway 205. The device-specific information may include information on the type of the control device 200, the manufacturer of the control device 200, and/or information for identifying the control device 200. The device-specific information may also include a MAC address of the control device 200.

The control device 200 may transmit a message indicating that the registration of the authentication key is completed with the device-specific information.

In step S256, the registration gateway 205 transmits a connection request, upon receiving the device-specific information and the authentication key registration completion message.

In step S258, the control device 200 transmits a connection completion message to the registration gateway 205, when completing the connection with the registration gateway 205.

In step S260, the registration gateway 205 transmits the connection information to the server 215. The connection information may include the received device-specific information.

In step S270, the server 215 transmits the received connection information of the control area to the control gateway 225.

Through the process illustrated on FIG. 2, an authentication key differentiated for each area can be registered to the control device 200 and a differentiated authentication procedure can be executed in the control area using the authentication key.

Figure 3:
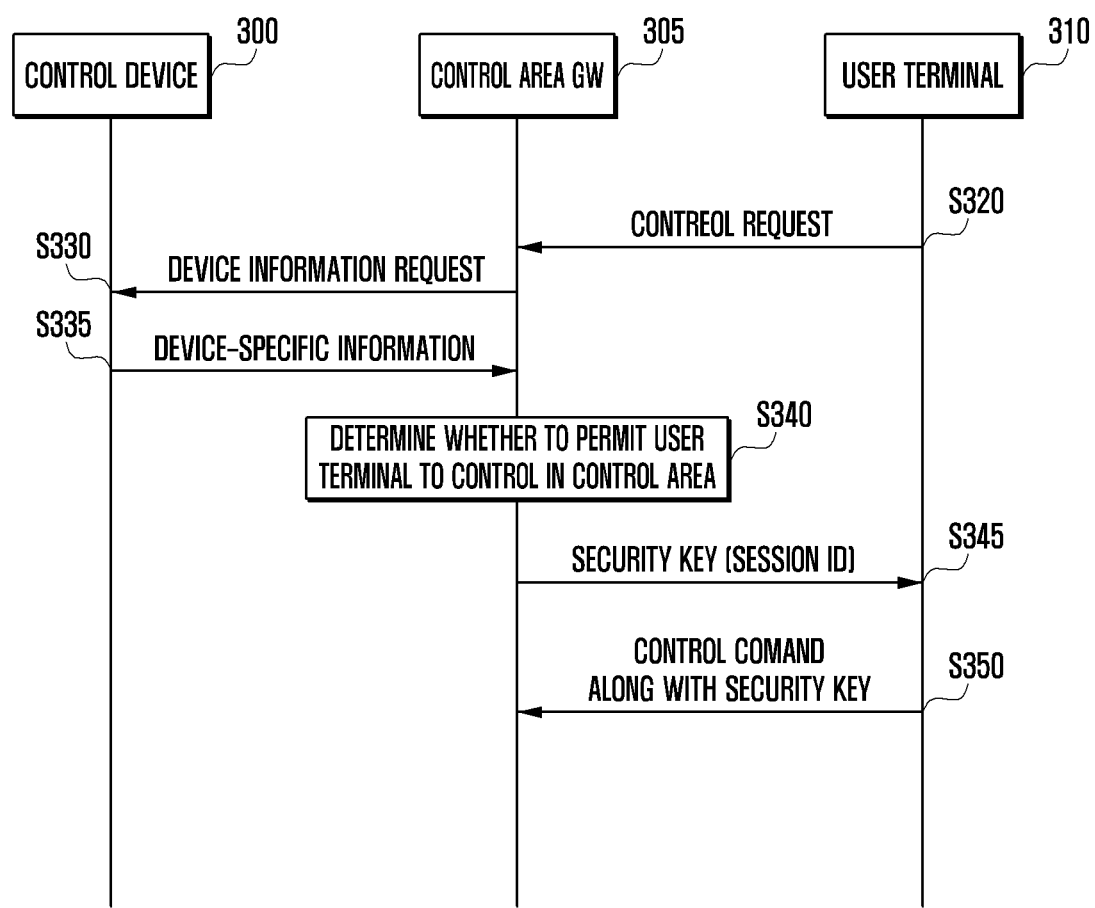
FIG. 3 is a signal flow diagram illustrating a process for issuing a security key to a user terminal by a gateway of a control area according to an embodiment of the present invention.

FIG. 3 is a signal flow diagram illustrating a process for issuing a security key to a user terminal by a gateway of a control area according to an embodiment of the present invention.

Referring to FIG. 3, in step S320, a user terminal 310 sends a control request to a gateway 305 of the control area, i.e., a control gateway, for control allowance in the control area thereof.

In step S330, the control gateway 305 sends a device information request to a control device 300, in order to determine whether the control of the user terminal 310 is allowed in the control area.

In step S335, the control device 300 transmits device-specific information to the control gateway 305, in response to the device information request. The device-specific information may be the same as that transmitted to the registration gateway 205 in step S254 of FIG. 2.

In step S340, the control gateway 305 determines whether to allow the control to the user terminal 310 in the control area. Depending on the authentication method of the control area, the operation of the control gateway 305 can be different. For example, as described above, when the authentication method of the control area is a server authentication, because the control gateway 305 has a server authentication in registration area, the control of the control area with respect to the user terminal 310 can be allowed without passing through the step S340. However, when the authentication method of the control area is a gateway authentication or an equipment authentication, then the control gateway 305 may determine whether to allow the control in the control area by the user terminal 310, in step S340. In FIG. 3, it is assumed that the authentication method of the control area is a gateway authentication or an equipment authentication.

The control gateway 305 may determine whether to allow the control, depending on whether device-specific information is included in the control device connection information that has been received, e.g., in step S270 in FIG. 2. However, when the control device 300 transmits the authentication key registered in the control device 300 with the device-specific information in step S335, it is possible for the control gateway 305 to determine whether to allow the control depending on whether the authentication key corresponds to the control gateway 305.

When it is determined that the control by the user terminal is allowed in the control area, the control gateway 305 transmits a security key to the user terminal 310 in step S345.

In step S350, in response to the security key, the user terminal 310 transmits a control command and the received security key to the control gateway 305.

In determining whether the user terminal 310 has the control authority and issuing a security key, the control gateway 305 may prevent equipment control by an unauthorized user terminal. In addition, a user terminal to which a security key for the control area has already been issued does not need the security key to be re-issued when making a control request to the control area. Therefore, the control gateway 305 does not need to repeatedly determine whether to allow the control for the control area.

When the user terminal 310 transmits the control command with the security key to the control gateway 305, the control gateway 305 determines whether the control device 300 in the control area requires additional authentication.

When the authentication method of the control area is a gateway Authentication, the control gateway 305 may determine that the authentication is completed by checking the device-specific information of the control device 300 or the authentication key, in step S340. Thus, in this case, when the user terminal 310 executes the control command with the security key, it is possible to grant the control authority to the control device 300, in step S350.

However, when the authentication method of the control area is an equipment Authentication, an additional authentication procedure using equipment of the control area is to be performed, as will be described in more detail below with reference to FIGS. 4, 5, and 6.

Figure 4:
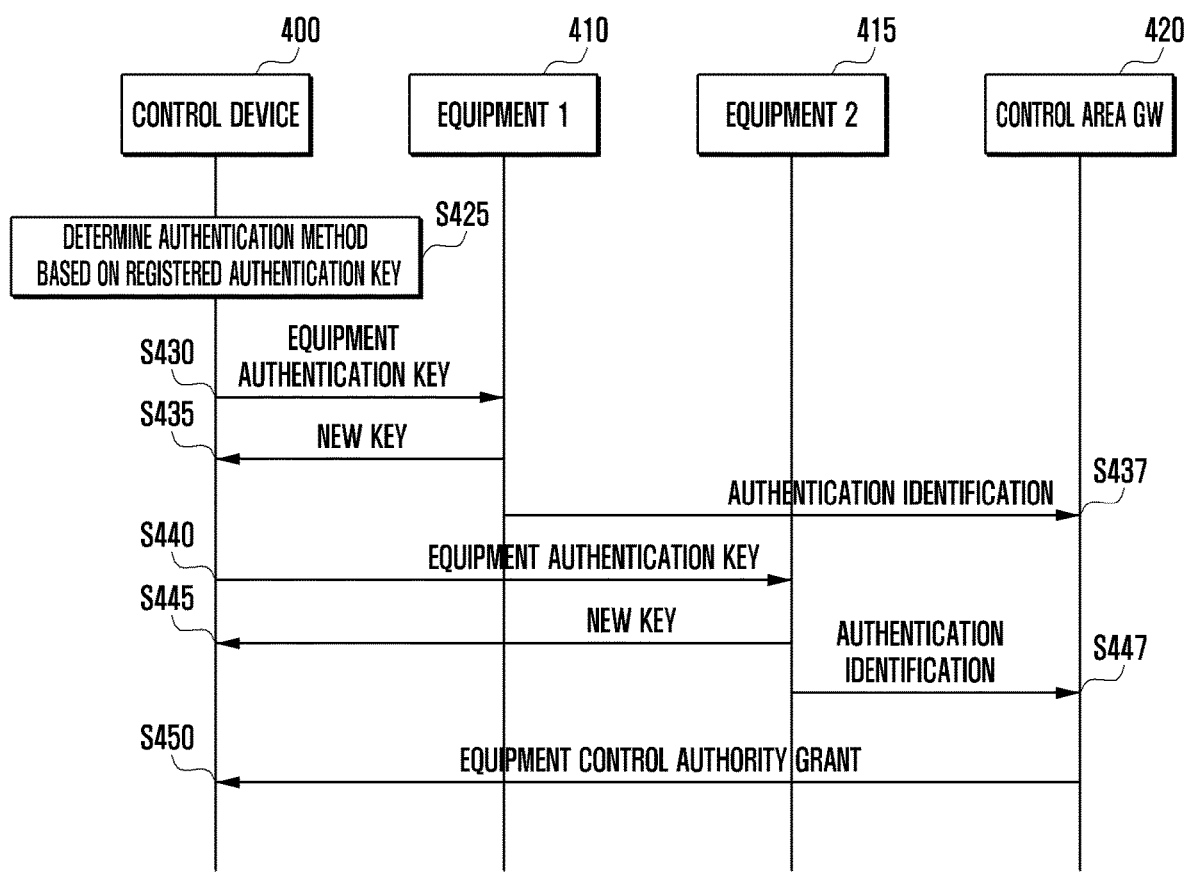
FIG. 4 is a signal flow diagram illustrating a process for granting equipment control authority to a control device by a gateway of a control area according to an embodiment of the present invention.

FIG. 4 is a signal flow diagram illustrating a process for granting equipment control authority to a control device by a gateway of a control area according to an embodiment of the present invention. Specifically, FIG. 4 illustrates an equipment authentication method performed by a control device of a control area.

Referring to FIG. 4, in step S425, a control device 400, when detecting an access to the control area, determines a number of equipment to be authenticated based on an authentication key registered in the control device 400. To detect that the control device 400 accesses the control area, it is possible to use wireless communication with a control gateway 420.

The control device 400 may determine, depending on the number of authentication keys corresponding to the equipment included in the registered authentication key, the number of equipment that should receive the authentication key.

In steps S430 and S440, the control device 400 transmits, based on the determined number of the equipment to be authenticated, the authentication key for the equipment to equipment 410 and 415 in the control area. For example, the control device 400 may randomly select equipment among the equipment in the control area and transmit an authentication key corresponding to the selected equipment. The authentication key may be one that has been generated by a server and registered at the control device 400 in a registration area.

In addition, the authentication key may include a MAC address of the control device 400. If the authentication key corresponds to the MAC address of the control device 400, a control gateway 420 may receive the MAC address from the server in the registration area, and the equipment 410 and 415 in the control area may receive and store the MAC address.

If the authentication key received in steps S430 and S440 corresponds to the equipment 410 and 415, the equipment 410 and 415 transmit a new key corresponding to the authentication key in steps S435 and S445.

The new key is transmitted to inform the control device 400 that the authentication has been identified by using a key exchange scheme.

In steps S437 and S447, the equipment 410 and 415 transmit an authentication identification message to the control gateway 420.

In step S450, the control gateway 420 grants a control authority for the control device 400, based on the received authentication identification message. That is, if the authentication method of the control area is an equipment authentication, the control gateway 420 may determine the number of equipment to be authenticated in the control area.

Similarly to the steps S437 and S447, when receiving the authentication identification message from the equipment 410 and 415, it is possible to determine whether the number of the received messages equals the number of the equipment to be authenticated. When the number of the received authentication identification messages equals the determined number of equipment to be authenticated, the control gateway 420 may grant equipment control authority to the control device 400 in step S450.

When the control device 400 has the equipment control authority granted from the control gateway 420, a description will be given where the connection with the control gateway 420 is broken and the control device 400 attempts to re-access the control area. In this case, because the control authority has already been granted to the control device 400, it is possible to start the control for the equipment in the control area, by performing an authentication key exchange between the equipment 410 and 415, which have already performed the authentication.

When performing the authentication procedure for the exchange of authentication keys between the control device 400 and the equipment 410 and 415 in the control area, as illustrated in FIG. 4, authentication key theft can be prevented by the exchange of distributed authentication keys. In addition, in the authentication process, the authentication procedure can be performed without gateway intervention, and the exposure risk of the authentication key corresponding to the gateway can be reduced.

Figure 5:
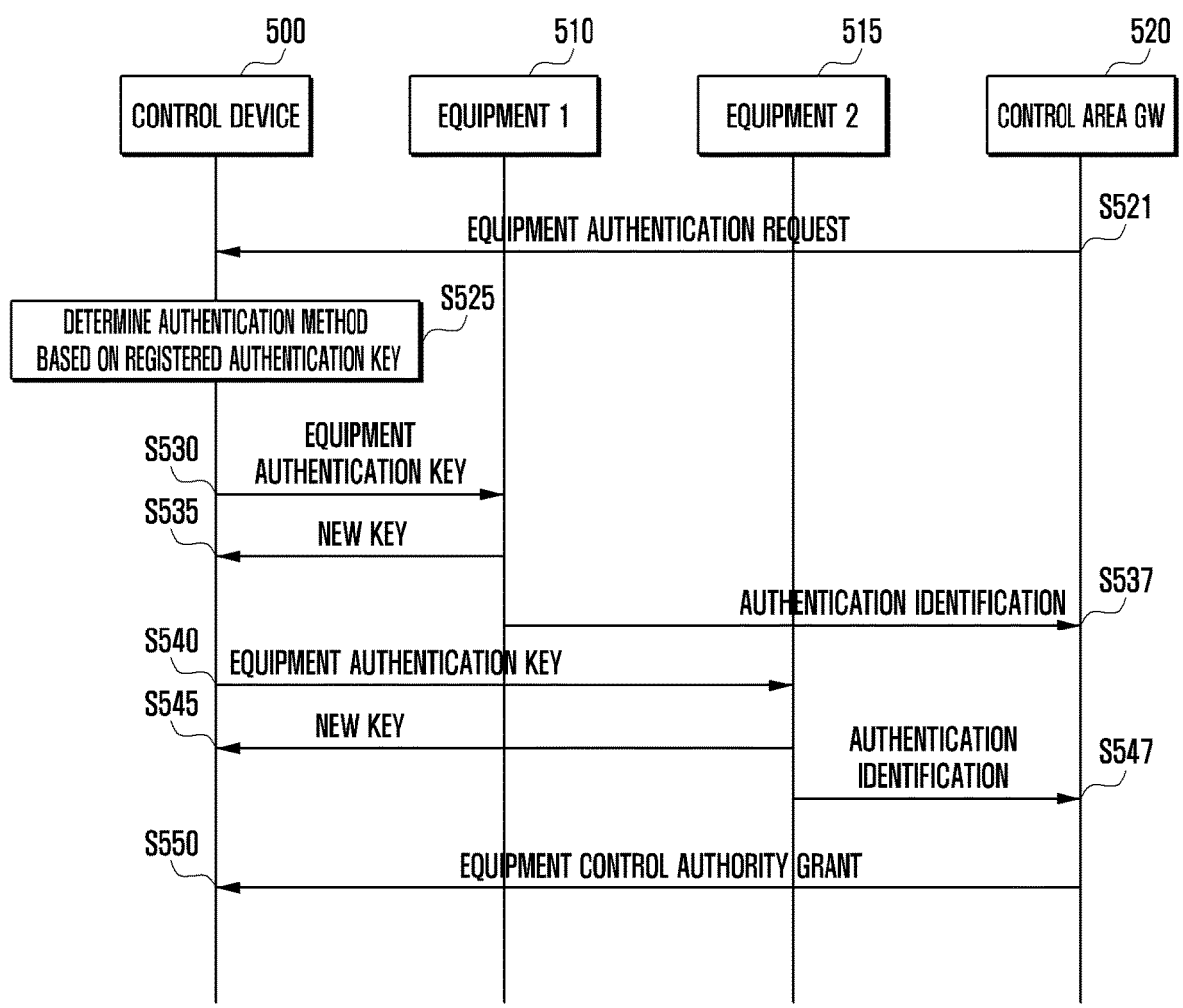
FIG. 5 is a signal flow diagram illustrating a process for granting equipment control authority to a control device by a gateway of a control area according to an embodiment of the present invention.

FIG. 5 is a signal flow diagram illustrating a procedure for granting equipment control authority to a control device by a gateway of a control area according to an embodiment of the present invention. Specifically, FIG. 5, similar to FIG. 4, describes an embodiment in which an equipment authentication method is to be performed by a control device of the control area.

Referring to FIG. 5, in step S521, a control device 500 receives an equipment authentication initiation request from a control gateway 520. That is, when a user terminal executes a control command with a security key in the control area, the control gateway 520 transmits an equipment authentication initiation request to the control device 500 detected in the control area. The following steps S525 to S550 are the same as steps S425 to S450 of FIG. 4. Accordingly, a repetitive description of steps S525 to S550 is omitted herein.

Figure 6:
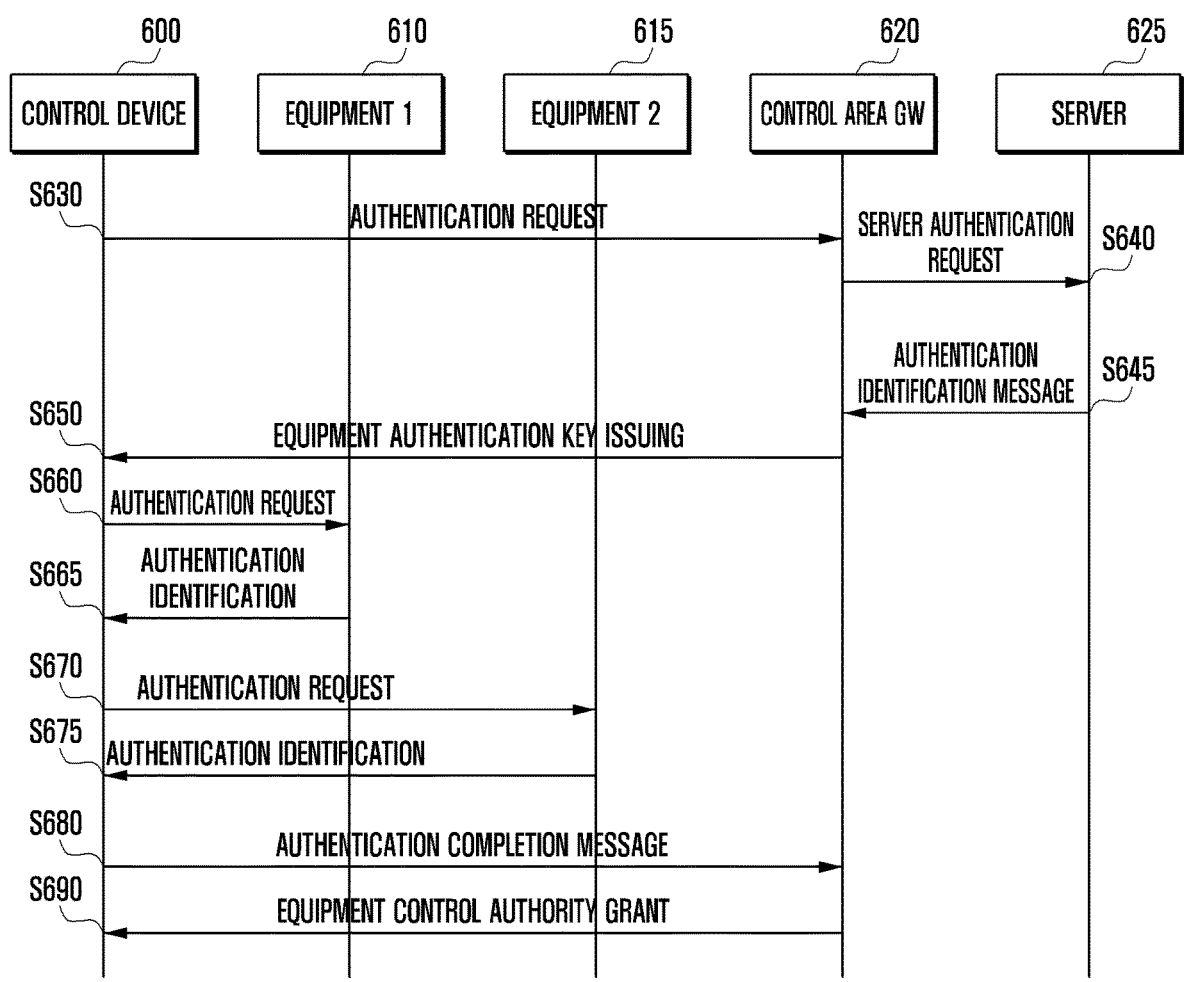
FIG. 6 is a signal flow diagram illustrating a process for granting equipment control authority to a control device by a gateway of a control area according to an embodiment of the present invention.

FIG. 6 is a signal flow diagram illustrating a procedure for granting equipment control authority to a control device by a gateway of a control area according to an embodiment of the present invention. Specifically, FIG. 6 illustrates a method for an equipment authentication in which a server is additionally involved.

Referring to FIG. 6, a control device 600 transmits an authentication request to a control gateway 620 in step S630. That is, the control device 600 may detect that it has an access to the control area using wireless communication with the control gateway 620.

In step S640, the control gateway 620 transmits a server authentication request to a server 625.

Upon receiving the server authentication request in step S640, the server 625 may perform a server authentication with respect to the control device 600. In addition, the control device 600 may transmit, in the server authentication request, the authentication key registered in the registration area.

The server 625 may determine whether the authentication key registered in the control device 600 is an authentication key generated by the server 625. In addition, the server 625 may determine whether the control device 600 has a control authority for the control area based on the registered authentication key.

In step S645, when it is determined that the control device 600 has a control authority in the control area, the server 625 transmits an authentication identification message to the control gateway 620.

The server 625 may also transmit, in the authentication identification message, an authentication key, which corresponds to equipment to be additionally authenticated by the control device 600 in the control area. That is, if the authentication method of the area the user intends to control is an equipment authentication, the server 625 may generate an authentication key that corresponds to the equipment and request a registration to the control device in the registration area, and may request a registration to the control device, after performing the additional authentication process in the control area.

In step S650, the control gateway 620 transmits, to the control device 600, a list of equipment to be specifically authenticated. That is, differently from the embodiments illustrated in FIG. 4 and FIG. 5, wherein the number of the equipment to be authenticated is determined and the control device may select the equipment to be randomly authenticated and perform the authentication procedure, an authentication procedure for the equipment included in the received authentication equipment list has to be performed. Further, the control gateway 620 may transmit the authentication key generated, after executing the server authentication, at the time of transmitting the list of equipment. The control device 600 receiving the authentication key and the authentication equipment list may initiate the authentication procedure based on the authentication equipment list.

Assuming that the equipment 610 and 615 are included in the authentication equipment list, in step S660 and step S670, the control device 600 transmits the authentication request to the equipment 610 and 615. The control device 600 may transmit the authentication request with the authentication key generated by the server 625. The equipment 610 and 615, which have received the authentication request, may determine whether the authentication key corresponds thereto.

When it is determined that the authentication key corresponds to the equipment 610 and 615, in step S665 and step S675, the equipment 610 and 615 transmit the authentication identification message to the control device 600.

In step S680, the control device 600 transmits, when receiving the authentication identification message with respect to all the equipment that transmit the authentication request, the authentication complete message to the control gateway 620.

In step S690, the control gateway 620 grants equipment control authority to the control device 600.

As described above, without registering the authentication key to the equipment to be authenticated in the registration area, after performing the additional server authentication in the control area, and then registering the authentication key corresponding to the equipment, the degree of security for a particular area can be enhanced.

Figure 7:
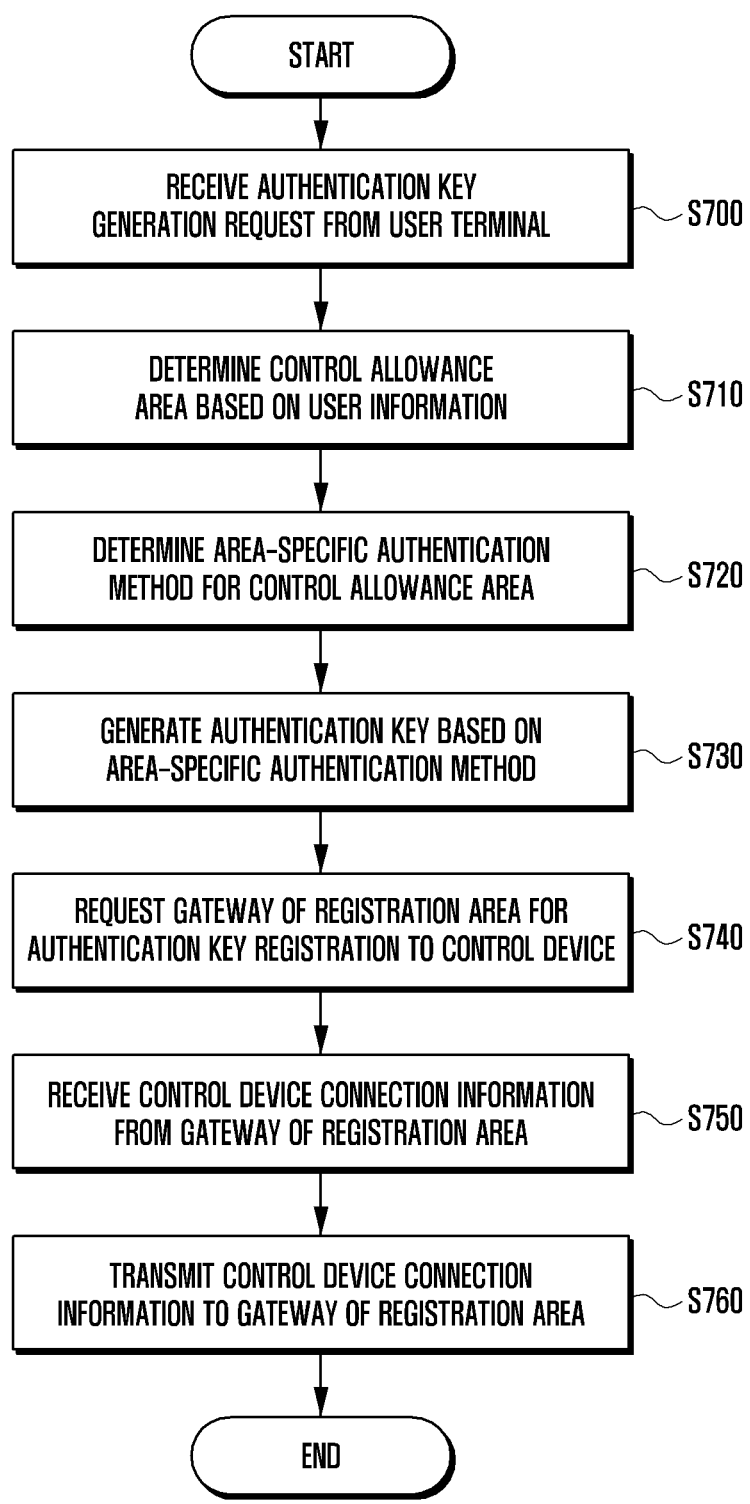
FIG. 7 is a flowchart illustrating a method for supporting, by a server, a connection between a control device and a gateway according to an embodiment of the present invention.

FIG. 7 is a flowchart illustrating a method for supporting, by a server, a connection between a control device and a gateway according to an embodiment of the present invention. Specifically, FIG. 7 is a flowchart illustrating a process of generating, by a server, an authentication key to be registered in a control device in order to connect the control device to the gateway.

Referring to FIG. 7, in step S700, the server receives an authentication key generation request from a user terminal. The authentication key generation request may include a user account and user information generated by the user terminal. As described above, the user information indicates information on a specific user who uses the user terminal.

In step 710, the server determines a control allowance area based on the user information.

In step S720, the server determines area-specific authentication method for the control allowance area. The server may determine the authentication method of the control allowance area based on information that is determined beforehand in the server, as described above.

In step S730, the server generates an authentication key based on the area-specific authentication method.

When the determined authentication method of the control allowance area is a server authentication, the server determines whether the user has a registration authority based on the received user information.

When the determined authentication method of the control allowance area is a gateway authentication, the server generates an authentication key corresponding to the gateway of the control allowance area.

When the determined authentication method of the control allowance area corresponds to an equipment authentication, the server determines the number of equipment to be authenticated among the equipment in the control allowance area. The server may generate an authentication key corresponding to the determined number of the equipment.

In step S740, the server requests, from a registration gateway, registration of the authentication key with respect to the control device.

In step S750, the server receives, from the registration area gateway, the connection information of the control device. That is, when the gateway of the registration area initiates a connection in order to request the control device for the authentication key registration, the control device approves the registration of the authentication key, and the connection is completed, the gateway of the registration area may transmit the connection information with the control device to the server. The server may store the connection information of the control device that has been received.

In step S760, the server transmits the connection information of the control device to the control gateway. The connection information of the control device is transmitted to the control gateway and can be used for authentication procedures for granting a control device registration and control authority in the control area.

Figure 8:
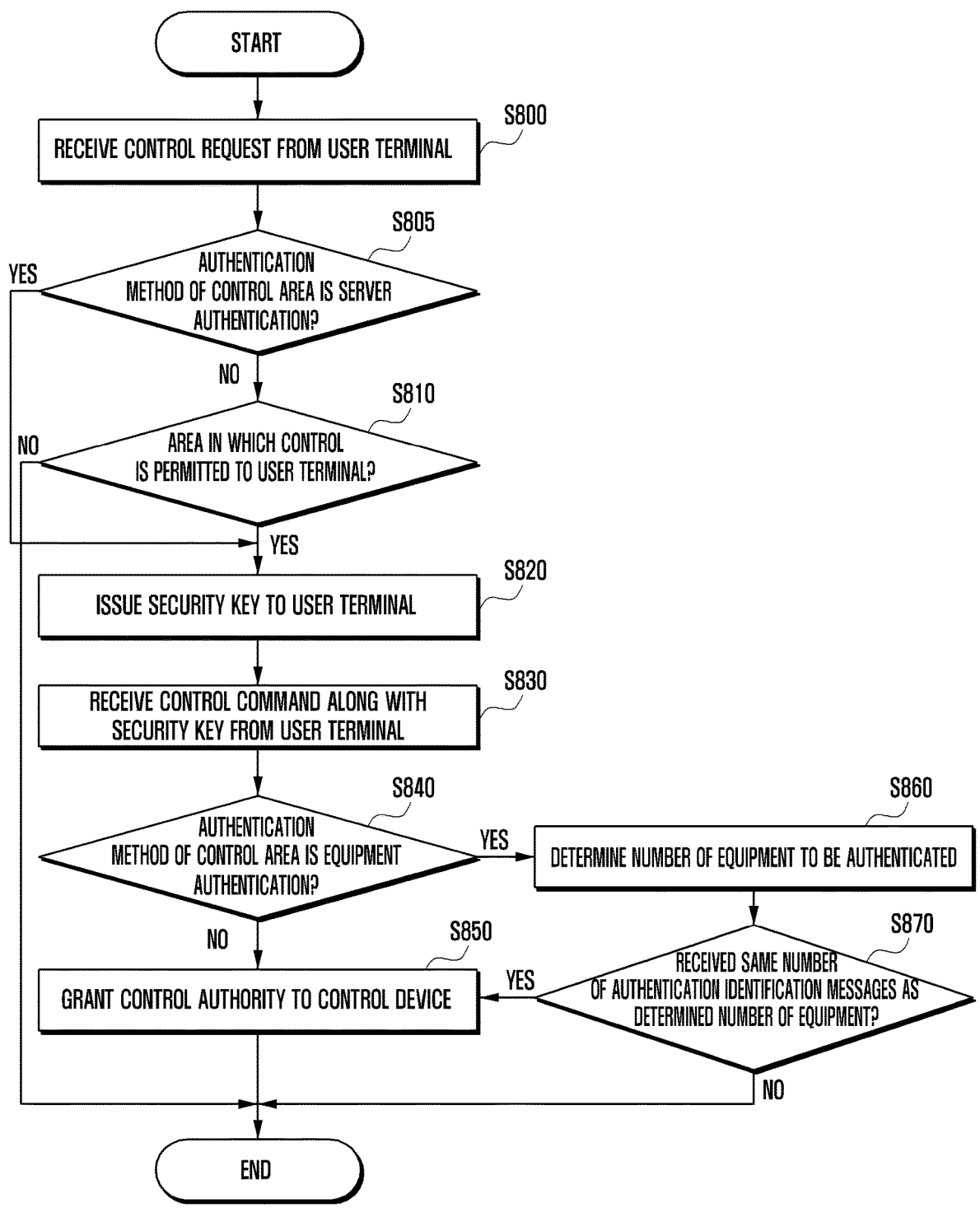
FIG. 8 is a flowchart illustrating a process for granting equipment control authority to a control device by a gateway of a control area according to an embodiment of the present invention.

FIG. 8 is a flowchart illustrating a process for granting equipment control authority to a control device by a gateway of a control area according to an embodiment of the present invention. Specifically, FIG. 8 is a flowchart illustrating a process of issuing a security key to the user terminal by a control gateway and performing an authentication procedure for the control device.

Referring to FIG. 8, the control gateway receives a control request from a user terminal in step S800. The control gateway may determine whether the authentication method of the control area corresponds to a server authentication in step S805.

If the determined authentication method is not server authentication in step S805, the control gateway determines whether the area controlled by the control gateway is an area in which the control by the user terminal 100 has been allowed in step S810.

However, if the determined authentication method is server authentication in step S805, or if the area controlled by the control gateway is an area in which the control by the user terminal 100 has been allowed in step S810, a security key is issued to the user terminal in step S820. That is, for the server authentication, because the server performs the authentication procedure by the user accounts and user information included in the authentication key generation request received from the user terminal, it is possible to grant a control authority to the control device, without an additional authentication procedure.

The control gateway 120 may determine whether the control area is an area where a control is permitted to the user terminal, when the authentication key registered in the control device 105 corresponds to the control gateway itself. The control gateway 120 may also request the device-specific information from the control device, in order to determine whether the control area is an area where a control is permitted to the user terminal.

When receiving the device-specific information from the control device, it is possible to determine that the control area is an area where a control is permitted to the user terminal, based on the device connection information received from the server. The authentication key is generated in the server based on the control allowance area that is determined based on the user information to be controlled, and the registration of the authentication key to the control device 105 means that a control is permitted to the user in the control area.

When the control area is not an area where a control is permitted to the user terminal in step 810, the control gateway ends the procedure.

In step S830, the gateway of the control area receives a control command with a security key from the user terminal.

In step S840, the gateway of the control area determines whether the authentication method of the control area is an equipment authentication. For example, the authentication method may include information on the object which has to be authenticated for each of the control areas.

In step S850, the control gateway grants an access authority to the control device, when the authentication method is not the equipment authentication, e.g., is a gateway authentication. That is, the control gateway may determine whether the control area is an area where a control is permitted to the user terminal, when transmitting the security key to the user terminal. Because the control gateway has identified the authentication key that corresponds to the control gateway and has been transmitted by the control device, it can be seen that the authentication on the control gateway has been completed.

However, when the authentication method is the equipment authentication, the control gateway determines a number of equipment to be authenticated in step S860. The number of the equipment to be authenticated may be determined in advance according to the characteristics of the control area controlled by the control gateway.

In step S870, the control gateway determines whether the same number of authentication identification messages have been received from the equipment in the control area, as the determined number of equipment. When the same number of authentication identification messages has been received from the equipment in the control area as the determined number of equipment, the control gateway grants an access authority to the control device in step S850.

When the same number of authentication identification messages have not been received from the equipment in the control area as the determined number of equipment, after a predetermined time, the control gateway ends the procedure.

In accordance with another embodiment of the present invention, a description will be given of a control method including automatic control for equipment using a control device, when the user has completed authentication in the control allowance area.

First, the gateway of the control area may automatically control the equipment in the control area based on the user behavior history information in the control area. That is, the gateway of the control area may collect the change of the user's unique biological information and the operation pattern of the equipment detected through the control device, e.g., when the control device is a wearable device. The gateway may collect the change of the user's unique biological information for each user using the authentication key included in the control device. The gateway may transmit the collected information to the server.

The server generates history information based on the operation pattern information of the equipment that corresponds to the change of the user-specific unique biological information. The history information may include the operation pattern information of the equipment that corresponds to the change of the user group-specific unique biological information.

For example, assuming the system is applied to a hotel, the user is an adult male in his 20s, a control allowance area is a room, and the adult man is detected as being in the room, it is determined that the man is sleeping when the heart rate and body temperature are at a constant numerical value or less, and it is possible to control the operation of lighting in the room and an air conditioning device.

In addition, the gateway of the control area may determine the position of a user using the control device, and may automatically control the equipment of the control area based on the determined user position. For example, when the user is allowed to control certain areas of the accommodation and the control device of the user has completed the authentication procedure, the lighting in the control area can be automatically controlled according to the movement of the user. Regardless of having a conventional control authority, different from a sensor of the lighting which detects every movement of the user and then turns the lighting on/off accordingly, the embodiment enables the user, to whom a control in the control area is permitted, to have a differentiated control of the equipment.

In addition, when the user is permitted to control a certain control area and the control device of the user has completed the authentication procedure, a door may be automatically opened or closed by detecting that the user has come close to the door of the control area. More specifically, when the control device is not detected in the control area, but a door lock of a control area door detects a signal transmitted from the control device above a certain threshold value, the detection information is transmitted to the gateway, and the gateway controls to open the door lock of the door. In addition, when the user is detected to be within the control area but the signal detected by the door lock of the door is less than a predetermined threshold value, the gateway may maintain the locked state of the door lock.

In addition, the gateway of the control area may transmit the information on the control area to the control device, using the location information of the control device. For example, when the user is allowed to control a shop, and the user wearing the control device has come close to the shop, the gateway of the shop may transmit product information or discount information to the control device of the user.

In addition, various embodiments of the present invention include a differentiated authentication method for providing a control authority for the equipment for each area and also a differentiated authentication method for granting a control authority for each operation. As the operation-specific differentiated authentication method, a description will be given on using at least one of a plurality of control devices and user-specific identification information or a combination thereof.

In accordance with an embodiment of the present invention, it is assumed that the operation, which the user performs in a room or in a space, has a predetermined score to acquire the control authority. In this case, it is assumed that the scores corresponding to the type of user-specific identification information and scores corresponding to the type of the plurality of control devices are also determined in advance. Accordingly, the user may acquire the control authority when the scores, which are obtained by adding the scores of the plurality of control devices and the user-specific identification information which are utilized in the authentication procedure, reach a predetermined score for the specific operation.

For example, for an operation of turning on a TV in the room, a predetermined score is assumed to be 30 points, and for an operation of payment in the store, a predetermined score is assumed to be 100 points. Further, when the user's terminal is used as the control device, and the authentication with the gateway is completed, it is assumed to be 10 points, and when a user wearable device is used as the control device, and the authentication with the gateway is completed, it is assumed to be 20 points. In addition, when an authentication is done by a password set by the user in advance, it is assumed to be 20 points, and when an authentication using a fingerprint which is user-specific biological information, it is assumed to be 40 points. The user may satisfy 30 points by authenticating the terminal and the wearable device with the gateway in the room, in order to acquire the control authority for the operation to turn on the TV in the room.

In another method, the user may also acquire the control authority of turning on the TV, when the authentication is done by using terminal authentication and a fingerprint which is unique biological information. However, for the operation of the payment in the store, for recognition using the terminal and a fingerprint, in order to satisfy the score, it is possible to acquire a control authority when the authentication is done using a password and a fingerprint as well as authentication of the terminal and the wearable device.

In addition, in accordance with an embodiment of the present invention, it is assumed that the operation, which the user performs in the room or in the space, has a predetermined security level to acquire the control authority. That is, as described above, in order to acquire a control authority for the operation, it is possible to pre-determine a section that varies discontinuously, rather than having a continuous score. In this case, step 1, step 2, and step 3 can be determined by dividing the level of the operation, and a plurality of control devices and the user-specific identification information needed to obtain the control authority for the operation of each stage can be determined in advance. For example, different from the use of the score to grant a control authority for the operation, when a predetermined security level of the operation for the payment is determined as step 5, it is possible to determine that the control authority may be obtained only when one of the unique biological information is included in order to satisfy the security level.

Further, it is possible to perform an authentication procedure using a plurality of control devices of the users in a certain group unit. For example, if two users use one room and forms a group, in order to use room service billed to the room, it is possible to grant control authority to the two users after completing the authentication of the two users. In addition, it is possible to apply a method of utilizing at least one or a combination of the plurality of control devices and unique identification information of the user as described above with respect to the authentication procedure of the plurality of users.

That is, the gateway may request additional authentication from the control device, when an additional authentication method for receiving a control authority for each operation is required for the control device that has received a control authority for an area. The gateway may determine, when receiving, from the terminal, the message requesting a grant of the control authority for certain operations, the authentication method for the operations. The authentication method of the operations may be determined by a method such as pre-determined score or security levels for the authentication of the operation described above. The gateway may determine the authentication method of the operation based on the method of receiving in advance from the server.

The gateway that has determined the authentication method may request the control device for the authentication based on the determined authentication method. For example, when the authentication method is determined as a security level determined in advance and user's unique biological information is required due to the predetermined security level, it is possible to transmit the message requesting the collection of the user's unique biological information to the control device. Although the aforementioned method corresponds to an embodiment of the differentiated authentication method to grant the control authority for each operation, the present invention is not limited thereto.

In addition, various embodiments of the present invention may be applied to payment services. That is, when applying the system to an area which provides services to the user, the user may make a collective payment after using the service by completing an authentication procedure of the control device in at least one control allowance area. The user may use the control device, which is authenticated in the control allowance area, as a simplified payment device, thereby increasing user convenience. In addition, a control is not permitted to an unauthorized user and theft and unauthorized use can be prevented.

In addition, the gateway of the control area may provide certain information to a user based on user biological information measured by the control device, e.g., a wearable device. The information provided to the user based on the biological information may be generated and stored in the server. The control gateway receives, from the control device, biological information of the current user, and determines the information to be provided to the user based on the information stored in the server. The control gateway may transmit the determined information to the control device, and the control device, which has received certain information, may display the received information on a display unit.

For example, when the user is in a store and the user's body temperature and heart rate, as measured by the control device, are at or above a specific numerical value, the network of the control area may receive, from the server, information on a beverage, which is effective for the body temperature and heart rate decrease, and transmit the information to the control device.

As described above, by effectively utilizing a control device, such as a wearable device, it is possible to provide separate customized service to users.

Figure 9:
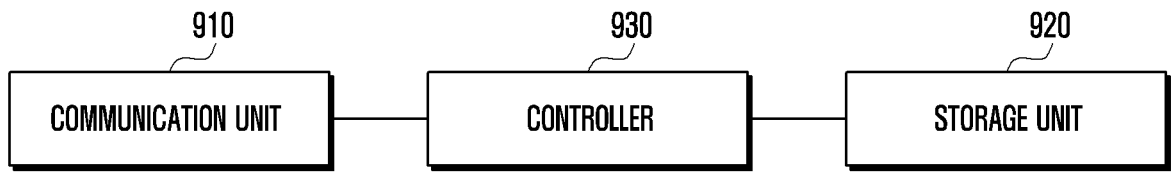
FIG. 9 illustrates a server according to an embodiment of the present invention.

FIG. 9 illustrates a server according to an embodiment of the present invention.

Referring to FIG. 9, the server includes a communication unit 910, a storage unit 920, and a controller 930.

The communication unit 910 is connected to a gateway and a user terminal for each area in the system, and may transmit and receive the information. The server may be connected to the user terminal using wireless communication. The server may be connected to the gateway of each area using wired communication or wireless communication.

The communication unit 910 may receive an authentication key generation request that includes user account information and user information from the user terminal. Further, the communication unit 910 may transmit the authentication key generated by the controller 930 to the gateway of the registration area. In addition, the communication unit 910 may receive the connection information with the control device from the gateway of the registration area. Further, the communication unit 910 may receive a server authentication request from the gateway of the control area, and may transmit an authentication identification message as a response thereto.

The storage unit 920 may store the information received from the communication unit and may transmit the information to the controller 930. The storage unit 920 may store information on the authentication method for the control area. The authentication method may include information on the object which has to be authenticated for each of the control areas. The authentication method may include server authentication, gateway authentication, and/or equipment authentication in the control area.

In addition, the storage unit 920 may store user accounts and user information received from the user terminal. Further, the storage unit 920 may store the grade information included in the user information, and store information on the control allowance area determined by the grade information. In addition, the storage unit 920 may store the authentication key generated by the controller 930. The storage unit 920 may store the connection device information of the control device that has been received from the gateway of the registration areas.

In addition, the storage unit 920 may receive and store, as history information, the equipment control pattern information that corresponds to the user's unique biological information. The storage unit 920 may also store information to be provided corresponding to the user's biological information.

The controller 930 may determine a control allowance area of the user terminal, in response to an authentication information generation request received from the user terminal, generate authentication information based on the pre-determined authentication method for each determined control allowance area, and control the request of the control device for registering the generated authentication information.

The controller 930 determines the control allowance area of the user terminal based on the user information received from the user terminal.

In addition, in the controller 930, generating of the authentication information includes generating authentication information corresponding to the gateway for controlling the equipment in the determined control allowance area.

In addition, in the controller 930, generating of the authentication information includes, if the authentication method corresponds to equipment authentication, determining the equipment of the control allowance area which are involved in the authentication, and controlling the generation of the authentication information corresponding to the determined equipment.

In addition, when generating the authentication information corresponding to the determined equipment, if the authentication method corresponds to equipment authentication, the controller 930 may receive an equipment authentication request from the control device. When authentication information corresponding to the gateway that is included in the control device is the authentication information corresponding to the gateway of the control area, the controller 930 may control the generation of the authentication information corresponding to the determined equipment.

Figure 10:
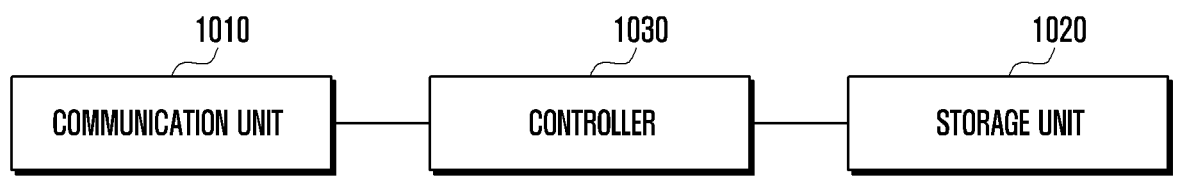
FIG. 10 illustrates a gateway according to an embodiment of the present invention.

FIG. 10 illustrates a gateway according to an embodiment of the present invention.

Referring to FIG. 10, the gateway includes a communication unit 1010, a storage unit 1020, and a controller 1030.

The communication unit 1010 connects to a server, a user terminal, and a control device, and transmits and receives the information. The communication unit 1010 may use wireless or wired communication.

In addition, the communication unit 1010 may receive, from the server, a request for registering a registration key. The communication unit 1010 may also transmit, to the control device 200, a connection initiation request including the registration key registration request. If the connection is completed, the communication unit 1010 may receive a connection complete message from the control device and transmit the information on the connection to the server.

For a gateway of the control area, the communication unit 1010 may receive the authentication identification message from one or more equipment in the control area. When the controller 1030 determines to give the control authority to a control device based on the authentication identification message, the communication unit 1010 may transmit a message that grants the control authority to the control device.

In addition, the communication unit 1010 may transmit a message requesting initiation of a device authentication procedure to the control device. In addition, the communication unit 1010 may transmit a server authentication request to the server.

The storage unit 1020 may store the authentication key included in the authentication key registration request received from the server. The storage unit 1020 may store the device-specific information of the control device that has been received from the control device. The storage unit 1020 may receive and store information on the authentication method for the control area.

When receiving the control request of the control device from the user terminal, the controller 1030 may determine whether authentication information corresponding to the gateway is registered in the control device, when the authentication information is registered in the control device, determine an authentication method in the area controlled by the gateway, and when the authentication method corresponds to equipment authentication, control the granting of the control authority to the control device based on the determined authentication method and the authentication identification message received from the equipment in the area controlled by the gateway.

In addition, when determining the authentication method of the area controlled by the gateway, if the authentication information is registered in the control device, the controller 1030 may transmit a security key to the user terminal. When receiving the control command corresponding to the security key, the controller 1030 may control the determination of the authentication method.

In addition, when granting the control authority to the control device, if the authentication method corresponds to gateway authentication, the controller 1030 may control the granting of the control authority to the control device in response to the received control command. When granting the control authority to the control device, if the authentication method corresponds to the equipment authentication, the controller 1030 may determine the number of equipment to be authenticated. When the received authentication identification message corresponds to the determined number of equipment, the controller 1030 may control the granting of the control authority to the control device. The controller 1030 may receive, from the control device, a message requesting the granting of the control authority for the operations, determine the authentication method for the operations, and control the request of the control device for the authentication based on the determined authentication method for the operations.

In addition, the controller 1030 may control the granting of the control authority for the operation to the control device when the authentication is completed based on the identified authentication method for the operations. In addition, the authentication method includes at least one combination of the number of user devices that includes the control device, the type of user devices, the number of pieces of unique biological information, and the type of unique biological information. The authentication method includes an authentication method for a plurality of users of a predetermined group.

Figure 11:
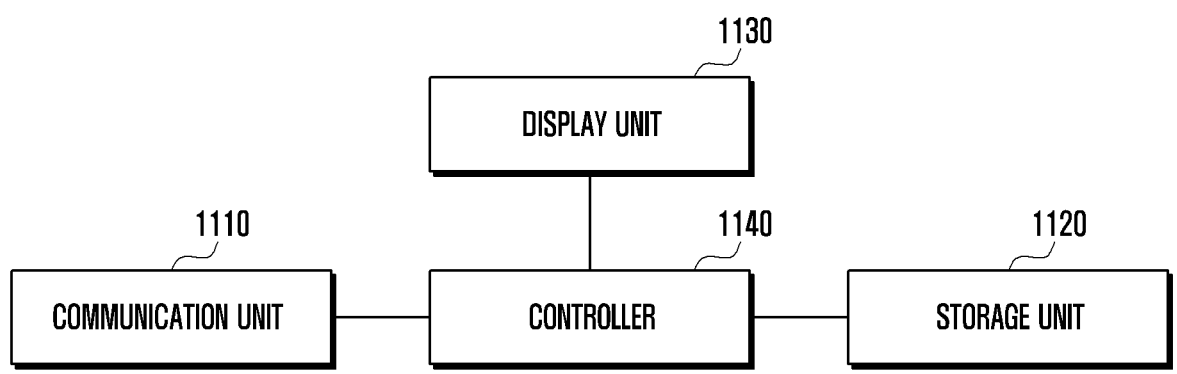
FIG. 11 illustrates a control device according to an embodiment of the present invention.

FIG. 11 illustrates a control device according to an embodiment of the present invention.

Referring to FIG. 11, the control device includes a communication unit 1110, a storage unit 1120, a display unit 1130, and a controller 1140.

The communication unit 1110 is connects with a gateway and a server, and transmits and receives the information. The communication unit 1110 may receive a connection initiation request including an authentication key registration request from the gateway of the registration area. The communication unit 1110 may receive a connection request from the gateway in the registration area.

In addition, the communication unit 1110 may receive a request for device information for the authentication procedures from the gateway of the control area. The communication unit 1110 may transmit device-specific information, in response to the request. The communication unit 1110 may transmit, when transmitting the device-specific information, the authentication key registered in the control device. The communication unit 1110 may transmit authentication information to terminals in the control area based on the authentication method of the control area determined by the controller 1140.

In addition, the communication unit 1110 may receive, upon completing the authentication procedure, equipment control authority from the gateway of the control area.

In addition, the communication unit 1110 may receive, from the gateway of the control area, a device authentication request message in the authentication process. In addition, the communication unit 1110 may transmit an authentication request to the gateway of the control area.

The storage unit 1120 may register and store the authentication key generated by the server. The storage unit 1120 may store the device-specific information on the control device in advance. In addition, the storage unit 1120 may store the authentication identification message received from the equipment in the control area.

The display unit 1130 may display, upon receiving a connection initiation request from the gateway of the registration area through the communication unit 1110, a message indicating the receipt of the request. In addition, the display unit 1130 may display, upon receiving the request, a message requesting the user for the connection with the gateway of the registration area and registration approval for the authentication key generated by the server. The message requesting the registration approval displayed on the control device 105 may be in the form of a pop-up window. The display unit 1130 may include a touch pad in order to receive input from the user. The user may press a button that is included in the message requesting the registration approval and approve the connection to the gateway of the registration area and the registration of the authentication key.

In addition, the display unit 1130 may display, when receiving the authority for controlling the equipment from the gateway of the control area, a message indicating that there is a control authority. The control device 105 may display, when the control authority is granted from the control area, information on one or more equipment that can be controlled by the control area. That is, the control device may display the information on the list of the controllable equipment and the control method thereof.

When receiving the control request of the control device from the user terminal, the controller 1140 may determine whether authentication information corresponding to the gateway is registered in the control device, when the authentication information is registered in the control device, determine an authentication method in the area controlled by the gateway, and when the authentication method corresponds to the equipment authentication, control the granting of the control authority to the control device, based on the determined authentication method and the authentication identification message received from equipment in the area controlled by the gateway.

In addition, when determining the authentication method of the area controlled by the gateway, if the authentication information is registered in the control device, the controller 1140 may transmit a security key to the user terminal. When receiving the control command corresponding to the security key, the controller 1140 may control the determination of the authentication method. In addition, when granting the control authority to the control device, and if the authentication method corresponds to gateway authentication, the controller 1140 may control the granting of the control authority to the control device in response to the received control command.

When granting the control authority to the control device, and if the authentication method corresponds to the equipment authentication, the controller 1140 may determine the number of equipment to be authenticated. When the received authentication identification message corresponds to the determined number of equipment, the controller 1140 may control the granting of the control authority to the control device.

In addition, the controller 1140 may transmit a message requesting the granting of the control authority for the operations to the gateway, and further control the receiving of a message requesting authentication based on the authentication method for the operations of the gateway.

Further, the controller 1140 may control the granting of the control authority for the operation to the control device, when the authentication is completed based on the identified authentication method for the operations. The authentication method may include at least one combination of the number of user devices that includes the control device, the type of user devices, the number of pieces of unique biological information, and the type of unique biological information. The authentication method may also include an authentication method for a plurality of users of a predetermined group.

According to the above-described embodiments of the present invention, when performing an authentication procedure for a control device for controlling equipment in a control area, an authentication key to be registered in the control device is generated based on user information and characteristics of the control area, and thus can adjust the degree of the authority to be granted to the control device. Therefore, embodiments of the present invention can provide a differentiated service for each user and apply the differentiated security criterion for each area.

While the present invention has been particularly shown and described with reference to certain embodiments thereof, it will be understood by those of ordinary skill in the art that various changes in form and details may be made therein without departing from the spirit and scope of the present invention as defined by the following claims and their equivalents.

What is claimed is:

1. A method for supporting device registration by a server, the method comprising:
   receiving a first message including an authentication information generation request and user information from a terminal;
   determining a control allowance area of the terminal based on the user information, wherein the control allowance area indicates an area being allowed to be controlled by the terminal and includes at least one equipment used for providing a service;
   determining an authentication method of the terminal for the determined control allowance area, based on a number of devices to be authenticated associated with the determined control allowance area, types of the devices, and types of the user information;
   generating authentication information for controlling the at least one equipment based on the determined authentication method, wherein a number of the generated authentication information is determined based on the determined authentication method; and
   transmitting a second message including the generated authentication information to a gateway associated with the determined control allowance area,
   wherein a third message for requesting a connection is transmitted from the gateway to the terminal in response to the second message, and
   wherein the devices include the server, the gateway and the at least one equipment.

2. The method of claim 1, wherein generating the authentication information comprises generating the authentication information corresponding to the gateway that controls the at least one equipment of the determined control allowance area.

3. The method of claim 2, wherein generating the authentication information comprises:
   determining at least one equipment in the determined control allowance area to be involved in the authentication, if the authentication method is an equipment authentication; and
   generating the authentication information corresponding to the determined at least one equipment.

4. The method of claim 3, wherein generating the authentication information further comprises:

if the authentication method is the equipment authentication, receiving an equipment authentication request from the terminal; and if authentication information corresponding to a gateway registered in the terminal is authentication information corresponding to the gateway of the control allowance area, generating authentication information corresponding to the determined at least one equipment.

5. A method for registering at least one equipment for use of a terminal by the gateway, the method comprising:

receiving, from the terminal, a control request for the terminal;

determining whether authentication information corresponding to the gateway is registered in the terminal based on the control request, wherein the authentication information is generated by a server based on an area controlled by the gateway and transmitted from the server to the terminal, wherein the area indicates an area being allowed to be controlled by the terminal and includes at least one equipment used for providing a service, and wherein the area is determined based on user information transmitted from the terminal to the server;

if the generated authentication information corresponds to the gateway and is registered in the terminal, identifying an authentication method for the terminal, the authentication method being determined by the server based on a number of devices to be authenticated for the area, types of the devices, and types of the user information, wherein the devices include the server, the gateway and the at least one equipment; and if the identified authentication method is an equipment authentication, granting a control authority to the terminal based on an authentication identification message received from at least one equipment in the area, wherein a number of the generated authentication information is determined based on the authentication method.

6. The method of claim 5, wherein identifying the authentication method for the terminal comprises:

if the authentication information is registered in the terminal, transmitting a security key to the terminal;

receiving a control command corresponding to the security key; and identifying the authentication method based on the control command.

7. The method of claim 6, wherein granting the control authority to the terminal comprises:

if the identified method is a gateway authentication, granting the control authority to the terminal in response to the received control command.

8. The method of claim 6, wherein granting the control authority to the terminal comprises:

if the identified authentication method is the equipment authentication, determining a number of equipment to be authenticated; and if a number of received authentication identification messages corresponds to the determined number of equipment, granting the control authority to the terminal.

9. The method of claim 5, further comprising:

receiving, from the terminal, a message requesting a granting of the control authority for an operation;

identifying an authentication method for the operation; and requesting the terminal for authentication based on the identified authentication method for the operation.

10. The method of claim 9, further comprising, if the authentication based on the identified authentication method for the operation is completed, granting a control authority for the operation to the terminal.

11. The method of claim 9, wherein the identified authentication method for the operation includes at least one combination of the number of devices that include the terminal, the type of the devices, a number of pieces of biological information, and a type of the biological information.

12. The method of claim 9, wherein the identified authentication method for the operation comprises an authentication method for a plurality of users of a predetermined group.

13. A method for supporting device registration by a terminal, the method comprising:

receiving a connection initiation request from a first gateway of a registration area;

registering authentication information in response to the connection initiation request;

identifying an authentication method for the terminal based on the authentication information, the authentication information being generated by a server based on an area being allowed to be controlled by the terminal and including at least one equipment being used for providing a service, wherein the authentication method being determined based on a number of devices to be authenticated for the area, types of the devices, and types of user information corresponding to the terminal, wherein the devices include the server, the first gateway and the at least one equipment;

if the authentication method is an equipment authentication, transmitting the authentication information to at least one equipment of the area; and receiving a control authority corresponding to the authentication information from a second gateway associated with the area, wherein a number of the authentication information is determined based on the authentication method.

14. The method of claim 13, wherein the control authority is determined based on an authentication identification message corresponding to the authentication information.

15. The method of claim 13, further comprising, if receiving a message corresponding to the authentication information from the at least one equipment, transmitting an authentication completion message to the second gateway.

16. The method of claim 13, further comprising:

transmitting a message requesting the granting of a control authority for an operation to the second gateway; and receiving, from the second gateway, a message requesting authentication based on the authentication method for the operation.

17. The method of claim 16, further comprising, if the authentication based on the authentication method for the operation is completed, receiving the control authority for the operation from the second gateway.

18. The method of claim 16, wherein the authentication method for the operation includes at least one combination of the number of devices that include the terminal, the types of the devices, a number of pieces of biological information, and a type of the biological information.

19. The method of claim 16, wherein the authentication method for the operation comprises an authentication method for a plurality of users of a predetermined group.

20. A server that supports a device registration, the server comprising:

a communication unit that communicates information with at least one of a gateway or a terminal; and
a controller that:
determines a control allowance area of the terminal based on a first message including an authentication information generation request and user information received from the terminal, wherein the control allowance area indicates an area being allowed to be controlled by the terminal and includes at least one equipment used for providing a service,
determines an authentication method of the terminal for the determined control allowance area, based on a number of devices to be authenticated associated with the determined control allowance area, types of the devices, and types of the user information,
generates authentication information for controlling the at least one equipment based on an authentication method of the terminal for the determined control allowance area, and controls the communication unit to transmit a second message including the generated authentication information to the gateway associated with the determined control allowance area,
wherein a number of the generated authentication information is determined based on the authentication method,
wherein a third message for requesting a connection is transmitted from the gateway to the terminal in response to the second message, and
wherein devices include the server, the gateway and the at least one equipment.

21. The server of claim 20, wherein the controller generates the authentication information corresponding to the gateway that controls the at least one equipment in the determined control allowance area.

22. The server of claim 21, wherein the controller generates the authentication information by determining at least one equipment to be involved in the authentication in the control allowance area, if the authentication method is an equipment authentication, and generating the authentication information corresponding to the determined at least one equipment.

23. The server of claim 22, wherein the controller generates the authentication information by
receiving an equipment authentication request from the terminal, if the authentication method corresponds to equipment authentication, and
if authentication information corresponding to a gateway registered in the terminal corresponds to authentication information corresponding to the gateway in the control allowance area, generating authentication information corresponding to the determined at least one equipment.

24. A first gateway that registers at least one equipment for use of a terminal, the gateway comprising:
a communication unit that communicates information with a server and a terminal; and
a controller that:
controls the communication unit to receive, from the terminal, a control request for the terminal,
determines whether authentication information corresponding to the first gateway is registered in the terminal based on the control request, wherein the authentication information is generated by a server based on an area controlled by the gateway and transmitted from the server to the terminal, wherein the area indicates an area being allowed to be controlled by the terminal and includes at least one equipment used for providing a service, and wherein the area is determined based on user information transmitted from the terminal to the server,
identifies an authentication method for the terminal, if the generated authentication information is registered in the terminal, the authentication method being determined by the server based on a number of devices to be authenticated for the area, types of the devices, and types of the user information, wherein the devices include the server, the gateway and the at least one equipment, and
grants, if the identified authentication method is an equipment authentication, a control authority to the terminal based on an authentication identification message received from at least one equipment in the area,
wherein a number of the generated authentication information is determined based on the authentication method.

25. The first gateway of claim 24, wherein the controller identifies the authentication method for the area controlled by the second gateway by
transmitting a security key to the terminal, if the authentication information is registered in the terminal, receiving a control command corresponding to the security key, and identifying the authentication method based on the control command.

26. The first gateway of claim 25, wherein the controller grants the control authority to the terminal, if the identified authentication method is a gateway authentication, in response to the received control command.

27. The first gateway of claim 25, wherein the controller grants the control authority to the terminal by
determining a number of equipment to be authenticated, if the identified authentication method is an equipment authentication, and
granting the control authority to the terminal, if a number of received authentication identification messages corresponds to the determined number of equipment.

28. The first gateway of claim 24, wherein the controller further controls the reception, from the terminal, of a message requesting the granting of the control authority for an operation, the identification of the authentication method for the operation, and the request for the authentication to the terminal based on the identified authentication method for the operation.

29. The first gateway of claim 28, wherein the controller grants a control authority for the operation to the terminal if the authentication based on the identified authentication method for the operation is completed.

30. The first gateway of claim 28, wherein the identified authentication method for the operation includes at least one combination of the number of devices that include the terminal, the types of the devices, a number of pieces of biological information, and the type of the biological information.

31. The first gateway of claim 28, wherein the identified authentication method for the operation comprises an authentication method for a plurality of users of a predetermined group.

32. A terminal that supports device registration, the terminal comprising:
a communication unit that communicates information with a server, and at least one gateway; and a controller that:
controls the communication unit to receive a connection initiation request from a first gateway of a registration area,
registers authentication information in response to the connection initiation request, identifies an authentication method for the terminal based on the authentication information, the authentication information being generated by a server based on an area being allowed to be controlled by the terminal including at least one equipment used for providing a service, wherein the authentication method being determined based on a number of devices to be authenticated for the area, types of the devices, and types of user information corresponding to the terminal,
wherein the devices include the server, the first gateway and the at least one equipment, if the identified authentication method is an equipment authentication, transmits the authentication information to the at least one equipment in the area, and receives a control authority for the area from a second gateway, and
wherein a number of the generated authentication information is determined based on the authentication method.

33. The terminal of claim 32, wherein the control authority is determined based on an authentication identification message corresponding to the authentication information.

34. The terminal of claim 32, wherein the controller further controls, if a message that corresponds to the authentication information from the at least one equipment is received, the transmission of an authentication completion message to the second gateway.

35. The terminal of claim 32, wherein the controller further controls the transmission, to the second gateway, of a message requesting granting of the control authority for an operation, and the reception, from the second gateway, of the message requesting authentication based on the authentication method for the operation.

36. The terminal of claim 35, wherein the controller further controls, if the authentication based on the authentication method for the operation is completed, receiving of the control authority for the operation from the second gateway.

37. The terminal of claim 35, wherein the authentication method for the operation includes at least one combination of the number of devices that include the terminal, the types of the devices, a number of pieces of biological information, and a type of the biological information.

38. The terminal of claim 35, wherein the authentication method for the operation comprises an authentication method for a plurality of users of a predetermined group.

* * * * *